United States Patent
Niitani

(10) Patent No.: US 8,436,103 B2
(45) Date of Patent: *May 7, 2013

(54) STAR POLYMER AND METHOD OF PRODUCING THE SAME

(75) Inventor: Takeshi Niitani, Ichihara (JP)

(73) Assignee: Nippon Soda Co., Ltd., Tokyo (JP)

( * ) Notice: Subject to any disclaimer, the term of this patent is extended or adjusted under 35 U.S.C. 154(b) by 1067 days.

This patent is subject to a terminal disclaimer.

(21) Appl. No.: 11/991,595

(22) PCT Filed: Sep. 7, 2006

(86) PCT No.: PCT/JP2006/317793
§ 371 (c)(1),
(2), (4) Date: Mar. 6, 2008

(87) PCT Pub. No.: WO2007/029794
PCT Pub. Date: Mar. 15, 2007

(65) Prior Publication Data
US 2009/0118436 A1 May 7, 2009

(30) Foreign Application Priority Data

Sep. 7, 2005 (JP) ................................ 2005-259300
Dec. 28, 2005 (JP) ................................ 2005-379857

(51) Int. Cl.
C08F 293/00 (2006.01)
C08F 257/02 (2006.01)
C08G 81/02 (2006.01)

(52) U.S. Cl.
USPC ........... 525/303; 525/242; 525/298; 525/299; 525/302; 525/308; 525/309; 525/312; 525/330.3; 525/333.3; 525/461

(58) Field of Classification Search .................. 525/242, 525/298, 299, 302, 303, 308, 309, 312, 330.3, 525/333.3, 461
See application file for complete search history.

(56) References Cited

U.S. PATENT DOCUMENTS 5,102,966 A 4/1992 Higashimura et al.
5,338,532 A 8/1994 Tomalia et al.
(Continued)

FOREIGN PATENT DOCUMENTS

EP 1 780 224 5/2007
JP 04-363306 12/1992
(Continued)

OTHER PUBLICATIONS

Francis et al., Macromolecules 36 (2003) 8253-8259.*

(Continued)

Primary Examiner — Roberto Rabago
(74) Attorney, Agent, or Firm — Kenyon & Kenyon LLP

(57) ABSTRACT

The present invention provides a novel narrow distribution dendrimer-like star polymer having a controlled molecular structure, and a method capable of easily producing the star polymer. Disclosed is a polymer comprising a core portion and an arm portion, wherein the arm portion includes a first generation composed of a polymer chain and a second generation composed of a polymer chain formed at the outer shell of the first generation, the number of arms of the second generation is larger than the number of arms of the first generation, the first generation composed of the polymer chain is a polymer chain derived from a monomer having a polymerizable double bond, and the ratio of the weight average molecular weight (Mw) to the number average molecular weight (Mn), (Mw/Mn), of the star polymer is within a range from 1.001 to 2.50. A compound containing a functional group capable of reacting with an anion, which serves as a core portion, is reacted with a polymer chain containing two or more functional groups and an anion end which serves as an arm portion.

14 Claims, 3 Drawing Sheets

U.S. PATENT DOCUMENTS

| | | | |
|---|---|---|---|
| 6,222,004 | B1 | 4/2001 | Ishikawa et al. |
| 6,268,462 | B1 | 7/2001 | Okamoto et al. |
| 6,288,221 | B1 | 9/2001 | Grinstaff et al. |
| 7,919,570 | B2 * | 4/2011 | Niitani et al. ............... 526/209 |
| 2002/0188080 | A1 | 12/2002 | Nakagawa |
| 2008/0214685 | A1 * | 9/2008 | Niitani et al. ............... 521/27 |
| 2011/0152388 | A1 * | 6/2011 | Niitani et al. ............... 521/27 |

FOREIGN PATENT DOCUMENTS

| | | |
|---|---|---|
| JP | 06-219966 | 8/1994 |
| JP | 10-195152 | 7/1998 |
| JP | 11-029617 | 2/1999 |
| JP | 11-116606 | 4/1999 |
| JP | 2000-100244 | 4/2000 |
| JP | 2002-20479 | 1/2002 |
| JP | 2002-540234 | 11/2002 |
| JP | 2004-107641 | 4/2004 |
| JP | 2004-189664 | 7/2004 |
| JP | 2004-256563 | 9/2004 |
| JP | 2005-154497 * | 6/2005 |
| JP | 2007-220376 | 8/2007 |
| JP | 2010-280899 | 12/2010 |
| WO | 00/12636 | 3/2000 |
| WO | 02/40594 | 5/2002 |
| WO | 2004/052943 | 6/2004 |
| WO | 2004/052944 | 6/2004 |
| WO | 2006/016665 | 2/2006 |
| WO | WO 2006/016665 A1 * | 2/2006 |
| WO | 2007/029794 | 3/2007 |

OTHER PUBLICATIONS

Knauss et al., Macromolecules 36 (2003) 6036-6042.*
Gauthier et al., Macromolecules 29 (1996) 519-527.*
Hirao et al., Macromol. Rapid Commun. 21 (2000) 1171-1184.*
Leon, Jeffrey W., et al., "Isophthalate Ester-Terminated Dendrimers: Versatile Nanoscopic Building Blocks with Readily Modifiable Surface Functionalities," *J. Am. Chem. Soc.*, (1996), vol. 118, pp. 8847-8859.
Angot, Stephanie et al., "Amphiphilic Stars and Dendrimer-Like Architetures Based on Poly(Ethylene Oxide) and Polystyrene," *Macromolecules*, (2000), vol. 33, pp. 5418-5426.
Hadjichristidis, Nikos et al., "Polymers with Complex Architecture by Living Anionic Polymerization," *Chem. Rev.*, (2001), vol. 101, pp. 3747-3792.
Beil, James et al., "Synthesis of Nanosized "Cored" Star Polymers," *Macromolecules*, (2004), vol. 35, pp. 778-787.
Jankova, Katja et al., "Star Polymers by ATRP of Styrene and Acrylates Employing Multifunctional Initiators," *J. of Polymer Science: Part A: Polymer Chemistry*, (2005), vol. 43, pp. 3748-3759.
Zhao, Youliang et al., "Synthesis of Well-Defined Star Polymers and Star Block Copolymers from Dendrimer Initiators by Atom Transfer Radical Polymerization," *Polymer*, (2005) vol. 46, pp. 5808-5819.
Japanese Patent Office, International Search Report and Written Opinion dated Nov. 7, 2006, from related International Patent Application No. PCT/JP2006/317793, filed Sep. 7, 2006 (in Japanese).
Raju Francis et al., "Synthesis and Surface Properties of Amphiphilic Star-Shaped and Dendrimer-like Copolymers Based on Polystyrene Core and Poly(ethylene oxide) Corona," *Macromolecules*, 2003, vol. 36, pp. 8253-8259.
Daniel M. Knauss et al., "((PS$_n$PS)$_m$ Star-Shaped Polystyrene with Star-Shaped Branches at the Terminal Chain Ends by Convergent Living Anionic Polymerization," *Macromolecules*, 2003, vol. 36, pp. 6036-6042.
Korean Office Action, Korean Patent Application No. 2008-7005411, dated Jan. 26, 2010 (English-language translation provided).
J. B. Beil, et al., "Synthesis of Nanosized Cored Star Polymers," *Macromolecules*, vol. 37, No. 3, pp. 778-787, (2004).
Search Report, European Patent Application No. EP 06 79 7650, dated May 28, 2010.
Nasser-Eddine, Mohamad, et al., "Synthesis of Polystyrene-Poly(*tert*-butyl methacrylate)-Poly(ethylene oxide) Triarm Star Block Copolymers", Journal of Polymer Science: Part A: Polymer Chemistry, 2004, vol. 42, pp. 1745-1751.
European Search Report, European Patent Application No. EP 10014901.2, dated Mar. 21, 2011.
Erdogan, T., et al., "Facile Synthesis of AB$_2$-Type Miktoarm Star Polymers through the Combination of Atom Transfer Radical Polymerization and Ring-Opening Polymerization", Journal of Polymer Science: Part A: Polymer Chemistry, 2004, vol. 42, pp. 2313-2320.
Kilian, Lars, et al., "Synthesis and Cleavage of Core-Labile Poly(Alicyl Methacrylate) Star Polymers", Journal of Polymer Science: Part A: Polymer Chemistry, 2003, vol. 41, pp. 3083-3093.
Gnanou, Yves, et al., "Synthesis of star-shaped poly(ethylene oxide)", Makromol. Chem. 1988, vol. 189, pp. 2885-2892.
European Search Report for 07790632.9, dated Sep. 9, 2010, 5 pages.
U.S. Office Action for U.S. Appl. No. 12/308,465, dated Jun. 10, 2011, 14 pages.
Chinese Office Action issued for Chinese Application No. 201110052841.3, dated Apr. 5, 2012, 14 pages (with English translation).
Chen, Er-Qiang, et al., "Isothermal Thickening and Thinning Processes in Low-Molecular-Weight Poly(ethylene oxide) Fractions Crystallized from the Melt. 8. Molecular Shape Dependence", Macromolecules, 1999, vol. 32, pp. 4784-4793.
Weyermann, Philipp, et al., "Dendritic Iron Porphyrins with Tethered Axial Ligands: New Model Compounds for Cytochromes", Agnew. Chem. Int. Ed., 1999, vol. 38, No. 21, pp. 3215-3219.
Khan, Ishrat M., et al., "ABA Triblock comb copolymers with oligo(oxyethylene) side chains as matrix for ion transport", Makromol. Chem., 1989, vol. 190, pp. 1069-1078.
Rizzardo et al., Radical Polymerization Handbook, 1999, pp. 107 (with English translation).
Benoit, Didier, et al., "Development of a Universal Alkoxyamine for "Living" Free Radical Polymerizations", J. Am. Chem. Soc., 1999, vol. 121, pp. 3904-3920.
Moinard, Delphine, et al., "SAXS from Four-Arm Polyelectrolyte Stars in Semi-Dilute Solutions", Macromol. Chem. Phys., 2003, vol. 204, pp. 89-97.
International Search Report issued for PCT/JP2005/014788, dated Dec. 6, 2005, 7 pages.
U.S. Office Action issued for U.S. Appl. No. 11/573,635 dated Jul. 13, 2010, 6 pages.
Japanese Office Action issued for JP Application No. 2006-531747, dated Aug. 23, 2011, 6 pages (with English translation).
Korean Office Action, dated Mar. 5, 2008, issued for Korean Patent Application No. 10-2008-7003342 with English translation thereof, 10 sheets.
Japanese Office Action, dated Aug. 23, 2011, issued for Japanese Patent Application No. 2010-181986 with English translation thereof, 9 sheets.
Official Inquiry issued for the related Japanese Patent Application No. 2006-531747 (counterpart of U.S. Patent No. 7,919,570 and U.S. Appl. No. 12/929,659) on Jan. 15, 2013 with English translation thereof, 7 sheets.
Toshinobu Higashimura, "Cationic polymerization" with English translation thereof, 1$^{st}$ Edition, 2$^{nd}$ printing, published on Jul. 20, 1974, published by Kagaku-Dojin Publishing Company, Inc, 6 sheets.

* cited by examiner (a)

(b)

(c)

(d)

STAR POLYMER AND METHOD OF PRODUCING THE SAME

This application is a national stage filing (35 U.S.C. §371) OF PCT/JP2006/317793, filed on Sep. 7, 2006, which claims priority from Japanese Patent Application No. 2005-259300, filed Sep. 7, 2005 and Japanese Patent Application No. 2005-379857, filed Dec. 28, 2005.

TECHNICAL FIELD

The present invention relates to a novel narrow distribution star polymer, and a method for producing the same.

Priority is claimed on Japanese Patent Application No. 2005-259300, filed in Japan on Sep. 7, 2005, and Japanese Patent Application No. 2005-379857, filed in Japan on Dec. 28, 2005, the contents of which are incorporated herein by reference.

BACKGROUND ART

Heretofore, as a dendrimer-like star polymer, a compound and a method for producing the same described below are known (refer to Non-Patent Document 1).

In a first step, a star polymer having a specific molecular weight, which includes three PEO arms, is synthesized by a core-first method using 2-ethyl-2-hydroxymethyl-1,3-propanediol. All three hydroxy groups (a) efficiently initiate polymerization of ethylene oxide to produce a product having Poisson molecular weight distribution. In the same manner, a PEO star polymer including four arms can be prepared using pentaerythritol (e).

In a second step, a terminal OH group is chemically modified with an acid halide to prepare star type macroinitiators (c) and (g).

In a final step, an amphiphilic star copolymer is synthesized by the growth of a polystyrene block in the presence of copper bromide/BiPy with respect to the star type macroinitiators (c) and (g) (refer to Scheme 2 of Non-Patent Document 1).

As the same dendrimer-like star polymer, the other compound as shown in the formula shown below, and a method for producing the same are known (refer to Non-Patent Document 2)

[Chemical Formula 2]

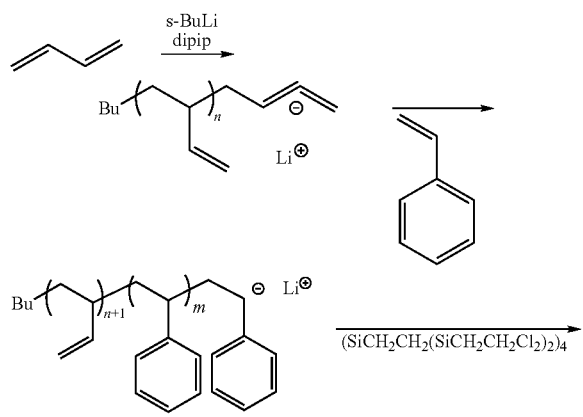

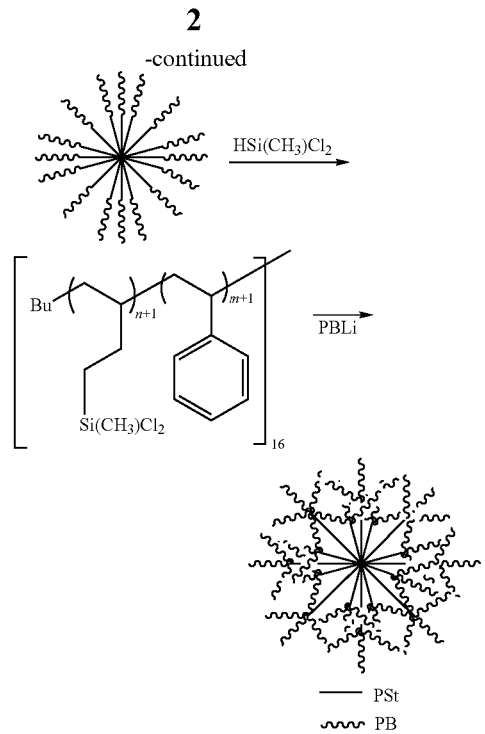

First, in the presence of dipiperidinoethane, an oligomer of butadiene is fabricated and then subjected to block addition polymerization with styrene to prepare a block copolymer including a polystyrene block and short 1,2-polybutadiene. A double bond of a side chain of a 1,2-polybutadiene unit is hydrosililated and then a living chain of 1,4-polybutadiene lithium or P2VPK is added to produce a star polymer of an umbrella structure (refer to Scheme 98 of Non-Patent Document 2).

[Non-Patent Document 1]
  Macromolecules 2000, 33, 5418-5426 (2000)
[Non-Patent Document 2]
  Chem. Rev. 2001, 101, 3747-3792 (2001)

DISCLOSURE OF THE INVENTION

However, the former had a problem that a polymer chain serving as a first generation is limited to a polyethylene oxide chain and thus it is impossible to apply to a dendrimer-like star polymer containing another kind of repeating unit, particularly a repeating unit derived from a polymerizable double bond.

The latter had a problem that since a functional group is introduced to a double bond at the end by hydrosililation, selectivity is low and a narrow distribution dendrimer-like star polymer is not obtained.

An object of the present invention is to provide a novel narrow distribution dendrimer-like star polymer having a controlled molecular structure, and a method for producing the same.

The present inventors have intensively studied so as to achieve the above object and have developed an anionic polymerization initiator having plural functional groups capable of serving as a living radical polymerization initiation point and have found that a first generation is formed by performing living anionic polymerization of a monomer having a polymerizable double bond using the anionic polymerization initiator and subjecting the resulting polymer to a nucleophilic addition reaction with a compound serving as a core portion, and furthermore, that a narrow distribution dendrimer-like star polymer is formed by performing living radical polymerization by functional group interconversion at the end. Thus, the present invention has been completed.

A first invention of the present invention provides a star polymer comprising a core portion and an arm portion, wherein the arm portion includes a first generation composed of a polymer chain and a second generation composed of a polymer chain formed at the outer shell of the first generation, the number of arms of the second generation is larger than the number of arms of the first generation, the first generation composed of the polymer chain is a polymer chain derived from a monomer having a polymerizable double bond, and the ratio of the weight average molecular weight (Mw) to the number average molecular weight (Mn), (Mw/Mn), of the star polymer is within a range from 1.001 to 2.50.

A second invention of the present invention provides a star polymer comprising a core portion and an arm portion, wherein the arm portion is a polymer chain having two or more functional groups derived from a monomer having a polymerizable double bond at the end, and the ratio of the weight average molecular weight (Mw) to the number average molecular weight (Mn), (Mw/Mn), of the star polymer is within a range from 1.001 to 2.50.

A third invention of the present invention provides a star polymer comprising a core portion and an arm portion containing a structure represented by the formula (VII):

[Chemical Formula 3]

(VII)

wherein B represents a group composed of a polymer chain, A represents a group composed of a polymer chain, an organic group other than the group composed of a polymer chain, or a hydrogen atom, and R represents a hydrogen atom or a C1-C4 alkyl group, and the ratio of the weight average molecular weight (Mw) to the number average molecular weight (Mn), (Mw/Mn), of the star polymer is within a range from 1.001 to 2.50.

A fourth invention of the present invention provides a method for producing a star polymer, which comprises reacting a compound containing a functional group capable of reacting with an anion, which serves as a core portion, with a polymer chain containing two or more functional groups and an anion end which serves as an arm portion.

EFFECTS OF THE INVENTION

The star polymer of the present invention is a narrow distribution star polymer having a controlled molecular structure and can be preferably used as electrochemical materials of batteries, capacitors, sensors, condensers, EC elements, and photoelectric transducers; inclusion materials; and functional materials of electric appliances and industrial equipment. Also, a film made of the star polymer can be used as a nanopattern formation material since it can form a microphase separation structure and also can control the size of a domain.

Particularly, the star polymer including a random repeating structure in the arm portion of the present invention is useful as adhesives, binders for the production of an electrode and compositions for a solid electrolyte.

According to the method for producing a star polymer in the present invention, it is possible to produce a narrow distribution star polymer having a controlled molecular weight simply and efficiently. The method of the present invention is suited for use as a method for producing a star polymer of the present invention.

BEST MODE FOR CARRYING OUT THE INVENTION

A feature of the star polymer of the present invention is that it has a dendrimer-like structure. Dendrimer-like structure means a structure in which a polymer chain is a unit which forms a generation of a dendrimer. Regarding the dendrimer, each generation is composed of a low molecular weight unimolecule and branching is repeated with progress of the generation, thus entirely constituting a multibranched macromolecule. Regarding the star polymer of the present invention, a polymer chain containing plural repeating units constitutes each generation in place of a low molecular weight unimolecule, thus entirely constituting a multibranched macromolecule.

A first invention of the present invention pertains to a star polymer comprising a core portion and an arm portion, wherein the arm portion includes a first generation composed of a polymer chain and a second generation composed of a polymer chain formed at the outer shell of the first generation, the number of arms of the second generation is larger than the number of arms of the first generation, the first generation composed of the polymer chain is a polymer chain derived from a monomer having a polymerizable double bond, and the ratio of the weight average molecular weight (Mw) to the number average molecular weight (Mn), (Mw/Mn), of the star polymer is within a range from 1.001 to 2.50.

Figure 1:
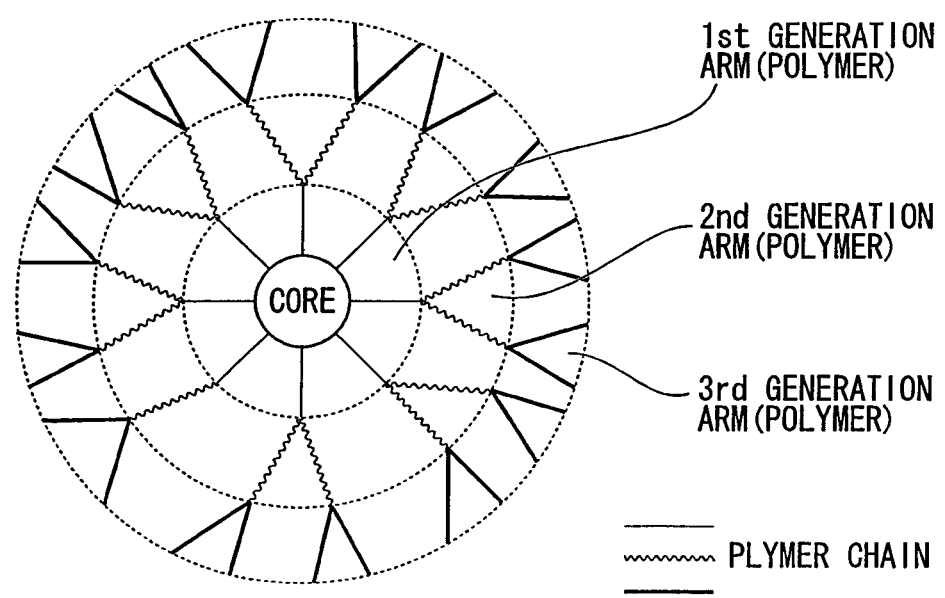
FIG. 1 schematically shows a first invention of the present invention.

The first invention of the present invention is as shown schematically in FIG. 1. In the present invention, it is possible to include an arm of a third or higher generation. In the third or higher generation, the number of arms is not specifically limited and may be the number of arms or less or more of the second generation. By repeatedly carrying out the method of the present invention, the same structure can be repeated, thus extending the generation.

More specifically, the first invention of the present invention has the following constitution.

The ratio of the weight average molecular weight (Mw) to the number average molecular weight (Mn), (Mw/Mn), of the star polymer is preferably within a range from 1.001 to 1.50, and particularly preferably from 1.01 to 1.30. The star polymer of the present invention is a narrow distribution polymer even if it has a low molecular weight, and can be preferably used as functional materials for various applications.

The number of arms of the second generation is not specifically limited as long as it is more than the number of arms of the first generation, and is preferably 1.5 to 3.0 times, and more preferably 2.0 to 2.5 times more than the number of arms of the first generation.

The first generation composed of the polymer chain in the arm portion is a polymer chain derived from a monomer having a polymerizable double bond, and specific examples of the monomer having a polymerizable double bond include an acrylate ester compound such as methyl acrylate, ethyl acrylate, n-propyl acrylate, isopropyl acrylate, n-butyl acrylate, t-butyl acrylate, n-hexyl acrylate, cyclopentyl acrylate, cyclohexyl acrylate, phenyl acrylate, or 2-pyridyl acrylate; a methacrylate ester compound such as methyl methacrylate, ethyl methacrylate, n-propyl methacrylate, isopropyl methacrylate, n-butyl methacrylate, t-butyl methacrylate, n-hexyl methacrylate, cyclopentyl methacrylate, cyclohexyl methacrylate, phenyl methacrylate, or 2-pyridyl methacrylate; a hydrocarbon aromatic vinyl compound such as acrylonitrile, methacrylonitrile, N,N-dimethylacrylamide, p-methylstyrene, p-t-butylstyrene, α-methylstyrene, p-t-butoxystyrene, m-t-butoxystyrene, p-(1-ethoxyethoxy)styrene, 3,4-dimethylstyrene, m-chlorostyrene, p-chlorostyrene, 4-t-butoxycarbonylstyrene, vinylnaphthalene, 9-vinylanthracene, 1,1-diphenylethylene, 2-vinylanthracene, p-vinylbenzyl propyl ether, p-vinylbenzyl butyl ether, p-vinylbenzyl hexyl ether, p-vinylbenzyl pentyl ether, m-N,N-diethylaminoethylstyrene, p-N,N-diethylaminoethylstyrene, p-N,N-dimethylaminoethylstyrene, m-vinylbenzyldimethylamine, p-vinylbenzyldimethylamine, p-vinylbenzyldiethylamine, p-vinylbenzyldi(n-propyl)amine, p-vinylbenzyldi(n-butyl)amine, vinylpyridine, 2-vinylbiphenyl, or 4-vinylbiphenyl; a heterocylic vinyl compound such as 2-vinylpyridine, 4-vinylpyridine, 2-vinylquinoline, 4-vinylquinoline, 2-vinylthiophene, or 4-vinylthiophene; methyl cinnamate; a maleate ester such as dimethyl maleate; maleic anhydride; a conjugated diene compound such as 1,3-butadiene, isoprene, 2,3-dimethyl-1,3-butadiene, 1,3-pentadiene, 2-methyl-1,3-octadiene, 1,3-hexadiene, 1,3-cyclohexadiene, 4,5-diethyl-1,3-octadiene, 3-butyl-1,3-octadiene, myrcene, or chloroprene; and 2-norbornene, 2-hydroxy-5-norbornene, 5-norbornene-2-carboxylic acid, methyl 5-norbornene-2-carboxylate, t-butyl 5-norbornene-2-carboxylate, 1-cyclohexyl-1-methylethyl 5-norbornene-2-carboxylate, 1-(4-methylcyclohexyl)-1-methylethyl 5-norbornene-2-carboxylate, 1-(4-hydroxycyclohexyl)-1-methylethyl 5-norbornene-2-carboxylate, 1-methyl-1-(4-oxocyclohexyl)ethyl 5-norbornene-2-carboxylate, 1-(1-adamanthyl)-1-methylethyl 5-norbornene-2-carboxylate, 1-methylcyclohexyl 5-norbornene-2-carboxylate, 2-methyl-2-adamanthyl 5-norbornene-2-carboxylate, 2-ethyl-2-adamanthyl 5-norbornene-2-carboxylate, 2-hydroxyethyl 5-norbornene-2-carboxylate, 5-norbornene-2-methanol, and 5-norbornene-2,3-dicarboxylic anhydride. Two or more kinds of these monomers can be used in combination. Of these monomers, a hydrocarbon aromatic vinyl compound and a heterocylic vinyl compound are preferable, and styrene, p-(1-ethoxyethoxy)styrene and p-tert-butoxystyrene are preferable.

The second generation composed of the polymer chain in the arm portion is preferably a polymer chain which includes a repeating unit containing a structure represented by formula (I)

[Chemical Formula 4]

wherein $R_{401a}$ and $R_{401b}$ each independently represents a hydrogen atom or a methyl group, or formula (II):

[Chemical Formula 5]

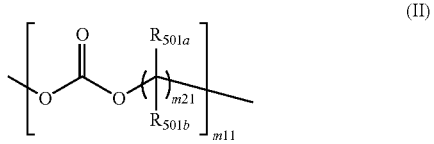

wherein $R_{501a}$ and $R_{501b}$ each independently represents a hydrogen atom or a C1-C10 hydrocarbon group, m21 represents an integer of 2 or more, each $R_{501a}$ may be the same as or different from one another and $R_{501b}$ may be the same as or different from one another, and m11 represents an integer of 1 or more. The polymerization degree of the repeating unit represented by formula (I) is preferably from 1 to 300, and particularly preferably from 1 to 100. The polymerization degree m11 of the repeating unit represented by formula (III) is particularly preferably from 1 to 300.

The repeating unit containing a structure represented by formula (I) includes the following. The case where $R_{401a}$ and $R_{401b}$ are hydrogen atoms is described as a typical example for convenience.

[Chemical Formula 6]

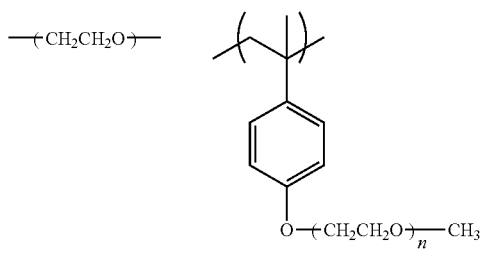

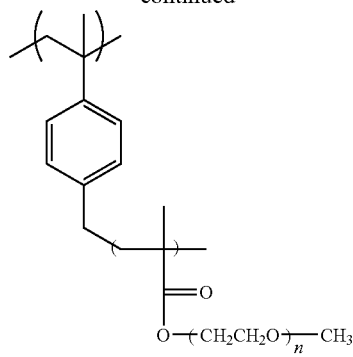

Furthermore, a repeating unit containing a structure represented by formula (I) is preferably a repeating unit represented by formula (III):

[Chemical Formula 7]

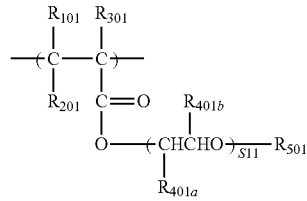

wherein $R_{101}$ to $R_{301}$ each independently represents a hydrogen atom or a C1-C10 hydrocarbon group, and $R_{10l}$ and $R_{301}$ may be bonded to form a ring, $R_{401a}$ and $R_{401b}$ each independently represents a hydrogen atom or a methyl group, $R_{501}$ represents a hydrogen atom, a hydrocarbon group, an acyl group or a silyl group, and s11 represents any integer from 1 to 100 and when s11 is 2 or more, groups represented by formula —CH($R_{401a}$)CH($R_{401b}$) O— may be the same or different.

Specific examples of $R_{11}$ to $R_{301}$ include an alkyl group such as a methyl group, an ethyl group, an n-propyl group, an isopropyl group, an n-butyl group, a sec-butyl group, an isobutyl group, or a t-butyl group; an aromatic hydrocarbon group such as a phenyl group, a naphthyl group, or a benzyl group; and a cycloalkyl group such as a cyclopropyl group or a cyclohexyl group.

Specific examples of $R_{501}$ include a hydrogen atom, a methyl group, an ethyl group, an n-propyl group, an isopropyl group, an n-butyl group, a sec-butyl group, an isobutyl group, a t-butyl group, an n-hexyl group, a phenyl group, a naphthyl group, a benzyl group, a phenethyl group, a formyl group; an acyl group such as an acetyl group, a propionyl group, or a butyryl group; and a silyl group such as a trimethylsilyl group, a t-butyldimethylsilyl group, or a dimethylphenylsilyl group.

$R_{101}$ to $R_{510}$ may contain a substituent on a carbon atom, and examples of the substituent include a halogen atom such as a fluorine atom, a chlorine atom, or a bromine atom; a hydrocarbon group such as a methyl group, an ethyl group, an n-propyl group, a phenyl group, a naphthyl group, or a benzyl group; an acyl group such as an acetyl group or a benzoyl group; a cyano group; a nitro group; a hydrocarbonoxy group such as a methoxy group or a phenoxy group; an alkylthio group such as a methylthio group; an alkylsulfinyl group such as a methylsulfinyl group; an alkylsulfonyl group such as a methylsulfonyl group; an amino group in which an amino group or a dimethylamino group may be substituted; and an anilino group.

$s_{11}$ represents any integer from 1 to 100 and is preferably any integer from 2 to 50.

Specific examples of the repeating unit represented by formula (III) include 2-methoxyethyl(meth)acrylate, 2-ethoxyethyl(meth)acrylate, 2-methoxypropyl(meth)acrylate, 2-ethoxypropyl(meth)acrylate, methoxypolyethylene glycol (number of units of ethylene glycol is from 2 to 100) (meth)acrylate, ethoxypolyethylene glycol (meth)acrylate, phenoxypolyethylene glycol (meth)acrylate, methoxypolypropylene glycol (number of units of propylene glycol is from 2 to 100) (meth)acrylate, ethoxypolypropylene glycol (meth)acrylate, phenoxypolypropylene glycol (meth)acrylate, polyethylene glycol mono(meth)acrylate, 2-hydroxypropyl (meth)acrylate, polypropylene glycol mono(meth)acrylate, polyethylene glycol-polypropylene glycol mono(meth)acrylate, octoxypolyethylene glycol-polypropylene glycol mono(meth)acrylate, lauroxypolyethylene glycol mono(meth)acrylate, stearoxypolyethylene glycol mono(meth)acrylate, "BLENMER PME series manufactured by NOF CORPORATION", acetyloxypolyethylene glycol (meth)acrylate, benzoyloxypolyethylene glycol (meth)acrylate, trimethylsilyloxypolyethylene glycol (meth)acrylate, t-butyldimethylsilyloxypolyethylene glycol (meth)acrylate, methoxypolyethylene glycol cyclohexene-1-carboxylate, and methoxypolyethylene glycol-cinnamate.

The content of the repeating unit represented by formula (I) in the polymer chain constituting the arm portion is preferably from 20 to 90% by mass, and more preferably from 35 to 70% by mass. When the content of the repeating unit represented by formula (I) is within the above range, the resulting polymer is more excellent in adhesive (binding) strength, film strength, conductivity, solvent resistance (electrolytic solution resistance) and thermal contraction resistance.

In formula (II), specific examples of $R_{501a}$ and $R_{501b}$ include the same as those of $R_{101}$ in formula (III). Similarly they may have a substituent on a proper carbon and specific examples of the substituent may be the same. Specific examples of the repeating unit containing a structure represented by formula (II) include the structures shown below. The structure in which $R_{501a}$ and $R_{501b}$ are hydrogen atoms and m21 is 2 is described as a typical structure for convenience.

[Chemical Formula 8]

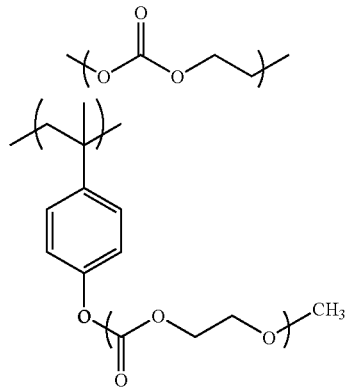

-continued

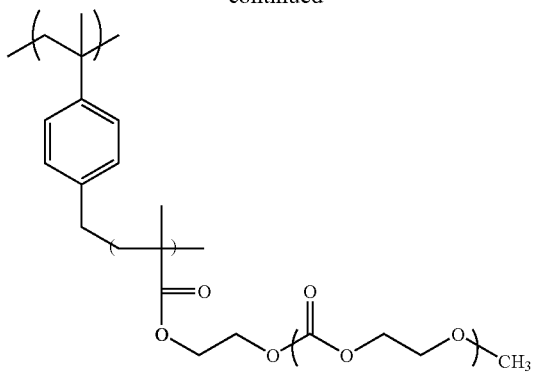

The method for producing the structure represented by formula (II) is not specifically limited and, for example, the structure can be obtained by ring-opening polymerization of a cyclic carbonate ester shown below.

[Chemical Formula 9]

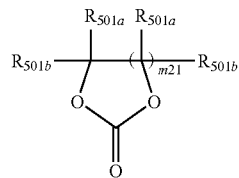

wherein each $R_{501a}$ may be the same as or different from one another and $R_{501b}$ may be the same as or different from one another.

By using a ring-opening polymerization monomer in place of the cyclic carbonate ester, a star polymer can similarly be obtained by extending a polymer chain. Specific examples of the monomer include cyclic ether, cyclic thioether, cyclic ester (lactone), cyclic amide (lactam), cyclic anhydride, N-carboxyanhydride, cyclic imine, cyclic siloxane, and cyclic carbonate. More specific examples of the monomers include ethylene oxide, propylene oxide, tetrahydrofuran, furan, 2-methyltetrahydrofuran, dibenzofuran, tetrahydrothiophene, propiolactone (β-lactone), butyrolactone (γ-lactone), δ-valerolactone (δ-lactone), butyrolactone, ε-caprolactone, β-propiolactam, γ-butyrolactam (2-pyrrolidone), δ-valerolactam (2-piperidone), γ-lactam, ε-caprolactam, β-propiolactam, N-carboxy-α-amino acid anhydride (NCA), and hexamethylcyclotrisiloxane.

The core portion is not specifically limited as long as it has a functional group capable of reacting with a functional group of the arm portion in the case of producing by an arm-first method. Also, the core portion is not specifically limited as long as it has a functional group capable of serving as a polymerization initiation point and a star polymer having a controlled structure is obtained in the case of producing by a core-first method. Specific examples thereof include a silane compound shown below, and those having the same structure as that described in the third invention shown below.

[Chemical Formula 10]

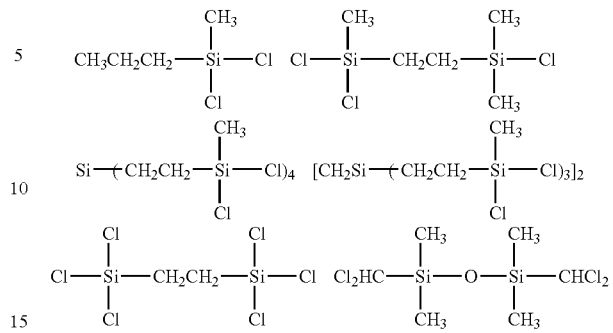

The second invention of the present invention pertains to a star polymer comprising a core portion and an arm portion, wherein the arm portion is a polymer chain having two or more functional groups derived from a monomer having a polymerizable double bond at the end, and the ratio of the weight average molecular weight (Mw) to the number average molecular weight (Mn) (Mw/Mn), of the star polymer is within a range from 1.001 to 2.50. The constituent components of the arm portion and (Mw/Mn) are the same as those in the case of the first invention.

In the polymer chain having two or more functional groups at the end, the structure at the end is not specifically limited and is preferably a polymer chain which includes an end containing a structure containing a carbon skeleton represented by formula (IV-1) or formula (IV-2):

[Chemical Formula 11]

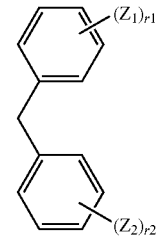

(IV-1)

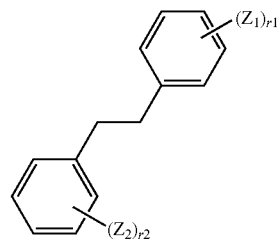

(IV-2)

wherein $Z_1$ and $Z_2$ each independently represents a hydroxyl group, a functional group containing an active halogen, a hydroxyalkyl group, a halogenated alkyl group, OR' (R' represents a hydrogen atom or an organic group), a functional group which can be converted into a functional group containing a hydroxyl group, a functional group which can be converted into a functional group containing an active halogen, or a functional group containing a polymer chain, and r1 and r2 each independently represents any integer from 1 to 5 and when r1 or r2 is 2 or more, each $Z_1$ may be the same as or different from one another and $Z_2$ may be the same as or different from one another.

Examples of R' include an alkyl group, a silyl group, a phosphoryl group, a sulfonyl group, an acyl group, and a group composed of a polymer chain.

Examples of the functional group which can be converted into a functional group containing a hydroxyl group and the functional group which can be converted into a functional group containing an active halogen include a silyloxy group such as a trimethylsilyloxy group, a t-butyldimethylsilyloxy group, or a dimethylphenylsilyloxy group; an aryloxy group such as a phenoxy group or a naphthoxy group; an alkoxy group such as a t-butoxy group, a methoxy group, an ethoxy group, a 1-methoxyethoxy group, or a 1-methoxymethoxy group; a trimethylsilyloxymethyl group; a 2-trimethylsilyloxyethyl group; a methoxymethyl group; a t-butoxymethyl group; and a 1-ethoxyethoxymethyl group.

Examples of $Z_1$ and $Z_2$ include, in addition to these described above, a hydroxymethyl group, a 1-hydroxyethyl group, a 2-hydroxyethyl group, a 1-hydroxybenzyl group, a chloromethyl group, a dichloromethyl group, and a 1-chlorobenzyl group.

The functional group containing an active halogen is a functional group containing a halogen atom at the α-position of the aromatic ring, or a functional group having a structure represented by formula (VI-1) or formula (VI-2):

[Chemical Formula 12]

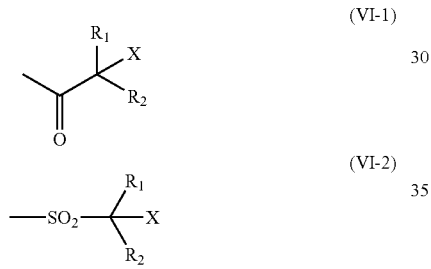

wherein X represents a halogen atom, and $R_1$ and $R_2$ each independently represents a hydrogen atom, a halogen atom or an organic group, provided that both $R_1$ and $R_2$ are not halogen atoms at the same time.

Specific examples of $R_1$ and $R_2$ include a fluorine atom, a chlorine atom, a bromine atom, and an iodine atom. The organic group is not specifically limited as long as it is a functional group having one or more carbon atoms, and specific examples thereof include an alkyl group such as a methyl group or an ethyl group; a cycloalkyl group such as a cyclopropyl; an alkenyl group such as an aryl group; an alkenyl group such as a propargyl group; an aryl group such as a phenyl group or a pyridyl group; an alkoxycarbonyl group such as a methoxycarbonyl group; an acyl group such as an acetyl group or a benzoyl group; a sulfonyl group such as a formyl group or a methanesulfonyl group; a hydrocarbonoxy group such as a methoxy group, an ethoxy group, a phenoxy group, or an acetoxy group; and a hydrocarbonthio group such as a methylthio group or a phenylthio group, and an oxidant thereof.

When $Z_1$ or $Z_2$ is a functional group containing a polymer chain in formula (VI-1) or formula (VI-2), the form of bonding between a polymer chain and a phenyl group is not specifically limited. The polymer chain may be formed by extending from a phenyl moiety, or may be formed by placing a functional group capable of reacting with polymer end anions to form a bond on a phenyl group or in the vicinity of the phenyl group, thereby reacting with polymer end anions.

Specific examples thereof include end structures represented by the formulas shown below.

[Chemical Formula 13]

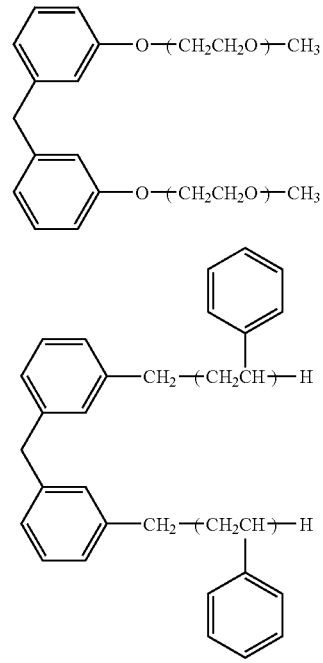

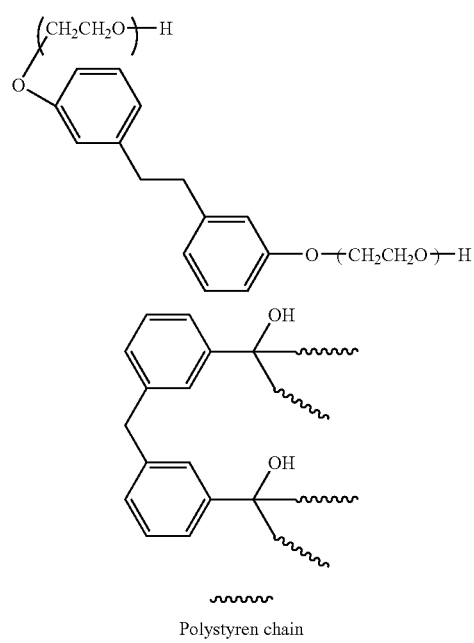

Polystyren chain

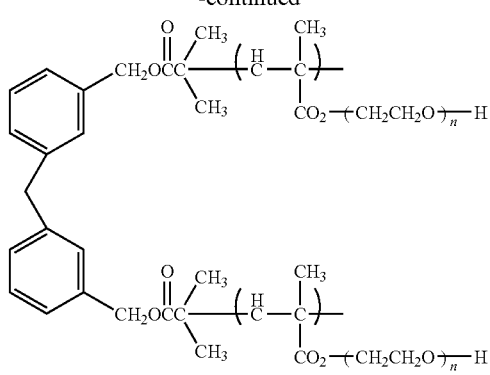
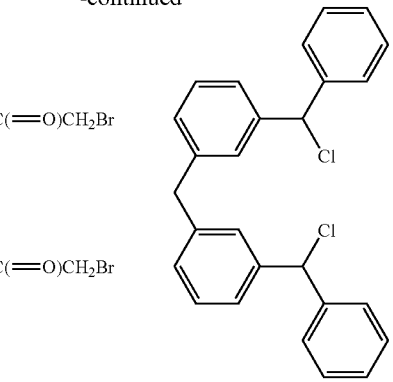
Specific examples of the structure represented by formula (IV-1) or formula (IV-2) include structures represented by the formulas shown below.
[Chemical Formula 14]
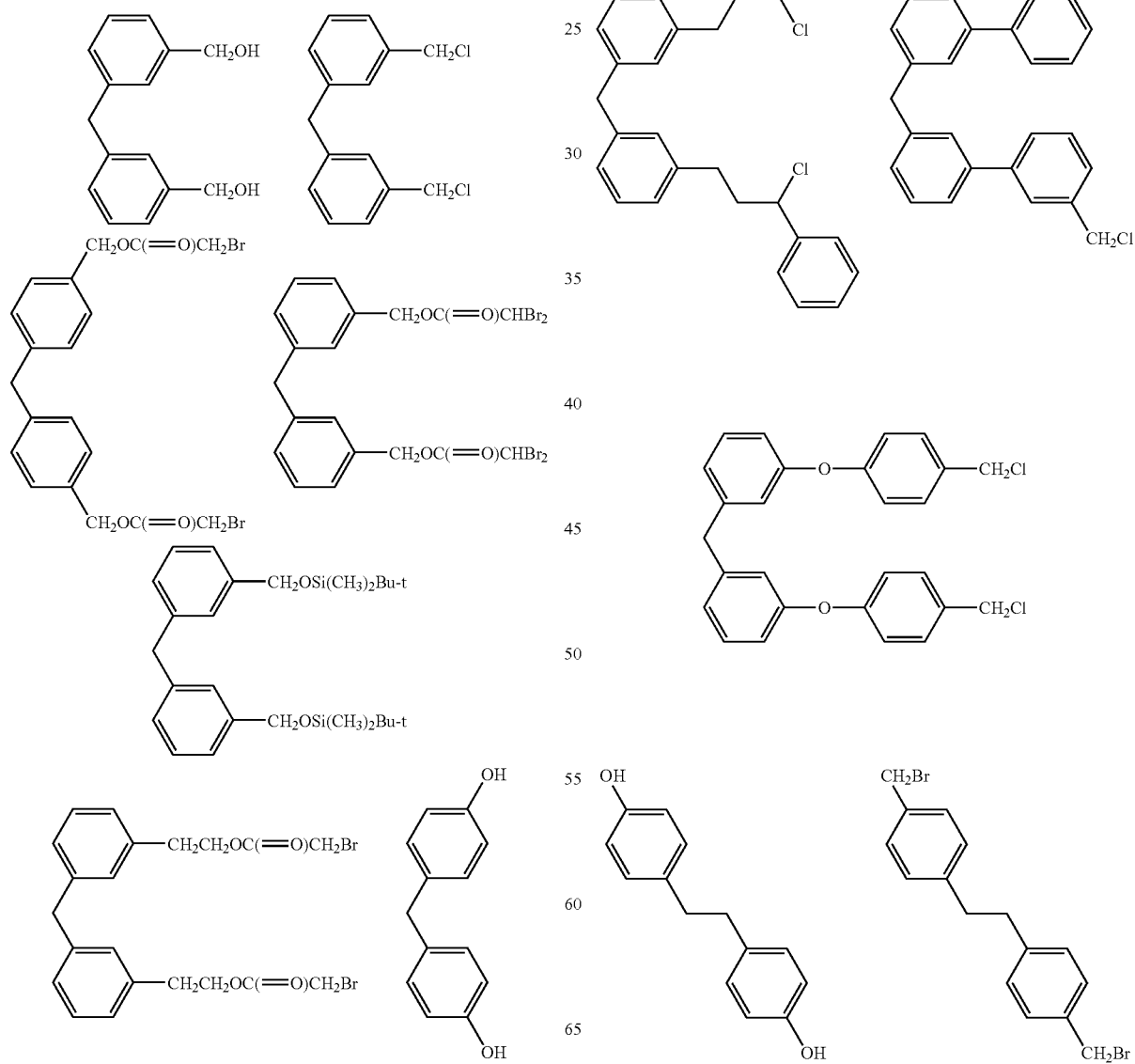

The third invention of the present invention pertains to a star polymer comprising a core portion and an arm portion containing a structure represented by the formula (VII):

[Chemical Formula 15]

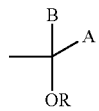

(VII)

wherein B represents a group composed of a polymer chain, A represents a group composed of a polymer chain, an organic group other than the group composed of a polymer chain, or a hydrogen atom, and R represents a hydrogen atom, organic group, or silyl group, and the ratio of the weight average molecular weight (Mw) to the number average molecular weight (Mn), (Mw/Mn), of the star polymer is within a range from 1.001 to 2.50.

A feature of the third invention of the present invention is that it includes, as the arm portion, a structure represented by formula (VII) and is a narrow distribution polymer. (Mw/Mn) is the same as in the case of the first invention.

The core portion in the star polymer of the present invention is not specifically limited as long as it is a group which has two or more valences and is capable of forming a star polymer including an arm portion containing a structure represented by formula (VII), and examples thereof include a chain or cyclic aliphatic group, an aromatic group, and a heterocycle group. Of these core portions, those including a structure in which the skeleton contains one or more aromatic rings such as an aromatic group or an aromatic hydrocarbon group and an arm portion represented by formula (VII) is directly branched from the aromatic ring are preferred. Specific examples of the core portion include the same as those in the case of the first invention.

Furthermore, the core portion is preferably a core portion including a skeleton represented by formula (VIII):

[Chemical Formula 16]

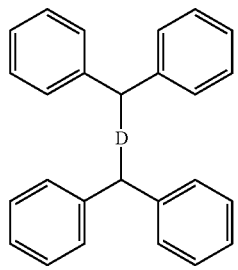

(VIII)

wherein D represents $(CH_2)_q$, or a p-phenylene group, and q represents an integer from 0 to 3, and more preferably a star polymer including a structure in which an arm portion represented by formula (VII) is directly branched from four benzene rings represented by formula (VIII).

Specific examples thereof include those described in J. Am. Chem. Soc., Vol. 118, No. 37, 8847, 1996, and those described below.

[Chemical Formula 17]

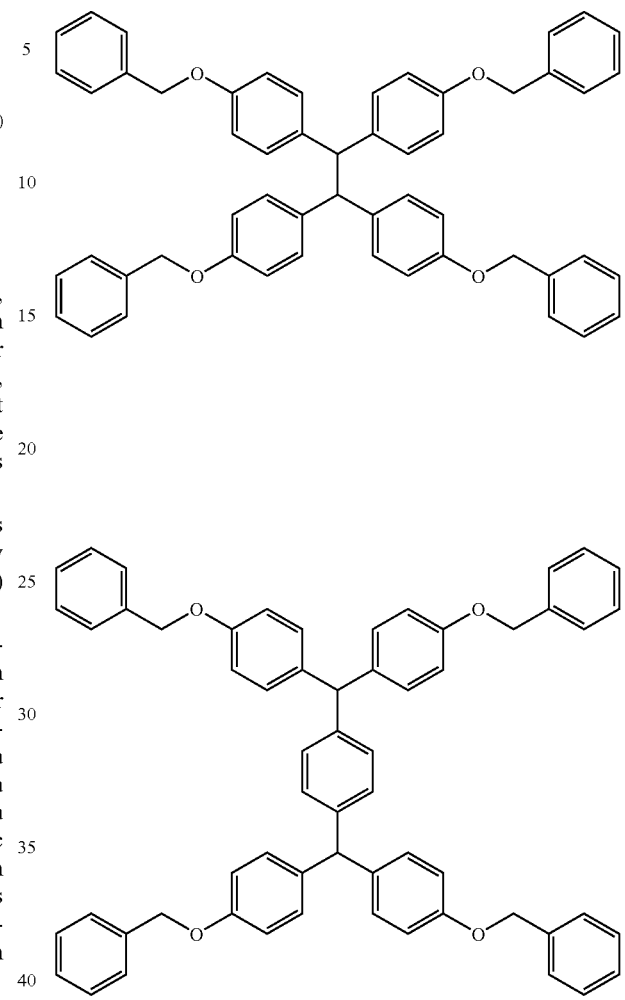

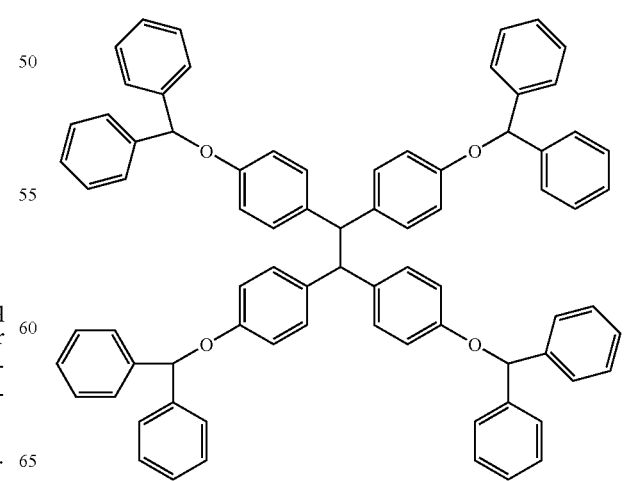

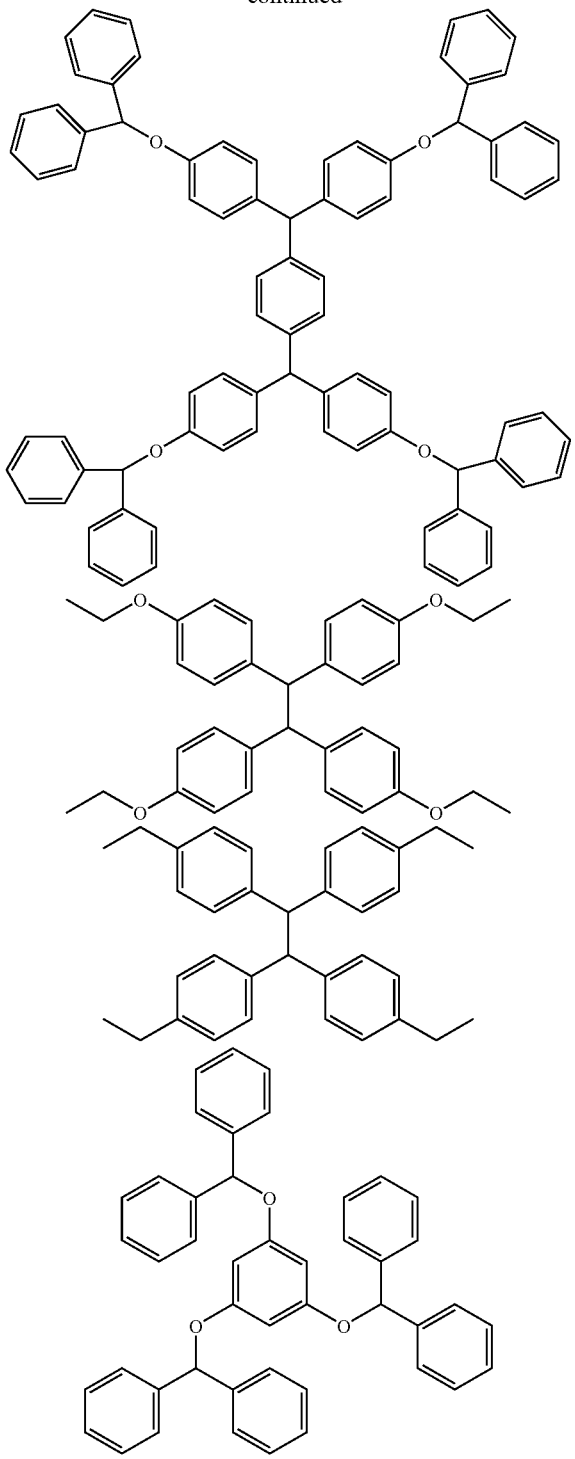

polymer chain can be further extended from the end. Namely, A or B as the group composed of a polymer chain preferably contains a group composed of a polymer chain a2 or b2 which is further extended from the end of the group a1 or b1 composed of a polymer chain having two or more functional groups at the end. The functional group may be a functional group which can be converted into a functional group containing a hydroxyl group, or a functional group which can be converted into a functional group containing an active halogen. The polymer chain having two or more functional groups at the end is preferably a polymer chain including a structure represented by formula (IV-1) or formula (IV-2) at the end in the second invention.

A or B as the group composed of a polymer chain in formula (VII) can include a repeating unit represented by formula (III), a repeating unit represented by formula (II), and a repeating unit represented by formula (IX):

[Chemical Formula 18]

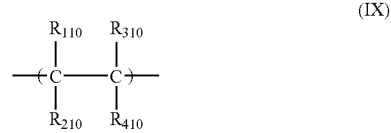

(IX)

wherein $R_{110}$ and $R_{310}$ each independently represents a hydrogen atom or a C1-C10 hydrocarbon group, and $R_{110}$ and $R_{310}$ may be combined to form a ring, $R_{210}$ represents an organic group containing at least one kind of functional group selected from the group consisting of a hydrogen atom, a C1-C10 hydrocarbon group, a hydroxyl group, a hydrocarbonoxy group, a carboxyl group, an acid anhydride group, an amino group, an ester group and an epoxy group, and $R_{410}$ represents an organic group containing at least one kind of functional group selected from the group consisting of a hydroxyl group, a carboxyl group, an epoxy group, an acid anhydride group and an amino group.

In the repeating unit represented by formula (IX), $R_{110}$ and $R_{310}$ each independently represents a hydrogen atom, or a hydrocarbon group of 1 to 10 carbon atoms, such as a methyl group, an ethyl group, an n-propyl group, an isopropyl group, an n-butyl group, a sec-butyl group, an isobutyl group, a t-butyl group, a phenyl group, a naphthyl group, or a benzyl group, and $R_{110}$ and $R_{310}$ may be combined to form a ring. Specific examples of the organic group represented by $R_{210}$ and $R_{410}$ include organic groups represented by the formulas shown below. p1 represents any integer from 1 to 3 in the formulas shown below.

The group made of a polymer represented by A or B is preferably a polymer chain derived from a monomer having a polymerizable double bond and specific examples thereof include those described as the polymer chain of the first generation of the first invention.

A or B as the group composed of a polymer chain is preferably a group a1 or b1 composed of polymer chain having two or more functional groups at the end. When the functional group is a functional group containing a hydroxyl group or a functional group containing an active halogen, the

[Chemical Formula 19]

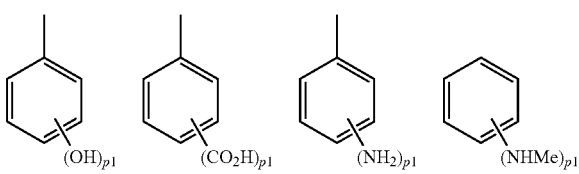

-continued

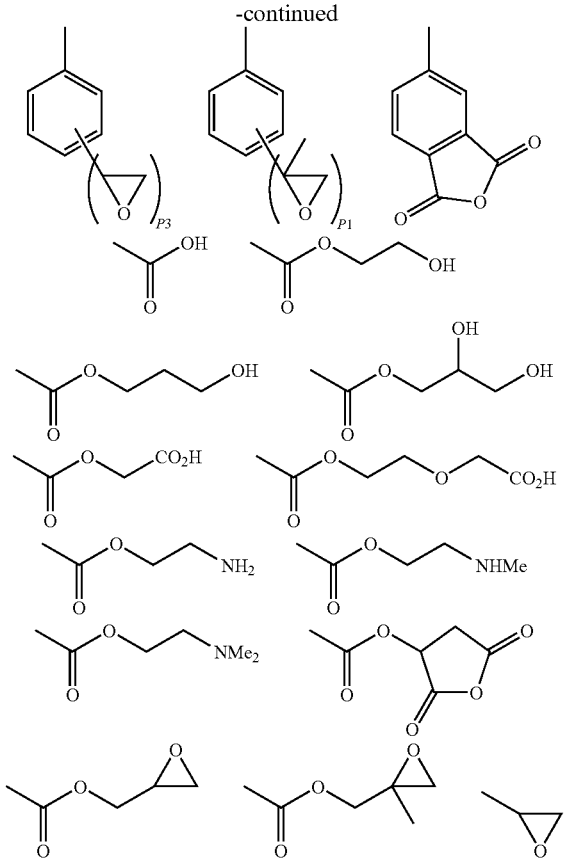

Also, $R_{110}$, $R_{210}$, $R_{310}$ and $R_{410}$ may have a substituent on a proper carbon atom, and specific examples include a halogen atom such as a fluorine atom, a chlorine atom, or a bromine atom; a hydrocarbon group such as a methyl group, an ethyl group, an n-propyl group, a phenyl group, a naphthyl group, or a benzyl group; an acyl group such as an acetyl group or a benzoyl group; a hydrocarbonoxy group such as a nitrile group, a nitro group, a methoxy group, or a phenoxy group; a methylthio group; a methylsulfinyl group; a methylsulfonyl group; an amino group; a dimethylamino group; and an anilino group.

Of the repeating units represented by formula (IX), a repeating unit represented by formula (IX-1), formula (IX-2), formula (IX-3) or formula (IX-4) shown below is particularly preferable.

Formula (IX-1):

[Chemical Formula 20]

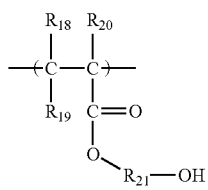 (IX-1)

wherein $R_{18}$ to $R_{20}$ each independently represents a hydrogen atom or a C1-C10 hydrocarbon group, $R_{18}$ and $R_{20}$ may be combined to form a ring, and $R_{21}$ represents a C1-C6 alkylene group, a C6-C10 divalent aromatic hydrocarbon group, a C3-C10 divalent alicyclic hydrocarbon group, or a divalent organic group as a combination of these groups.

Formula (IX-2):

[Chemical Formula 21]

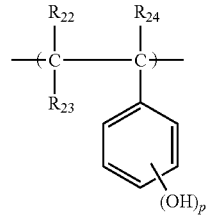 (IX-2)

wherein $R_{22}$ to $R_{24}$ each independently represents a hydrogen atom or a C1-C10 hydrocarbon group, and p represents any integer from to 3.

Formula (IX-3):

[Chemical Formula 22]

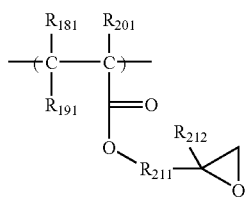 (IX-3)

wherein $R_{181}$, $R_{191}$ and $R_{201}$ each independently represents a hydrogen atom or a C1-C10 hydrocarbon group, $R_{181}$ and $R_{201}$ may be combined to form a ring, $R_{211}$ represents a C1-C6 alkylene group, a C6-C10 divalent aromatic hydrocarbon group, a C3-C10 divalent alicyclic hydrocarbon group, or a divalent organic group as a combination of these groups, and $R_{212}$ represents a hydrogen atom or a C1-C4 alkyl group.

Formula (IX-4):

[Chemical Formula 23]

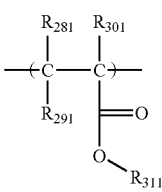 (IX-4)

wherein $R_{281}$, $R_{291}$ and $R_{301}$ each independently represents a hydrogen atom or a C1-C10 hydrocarbon group, $R_{281}$ and $R_{301}$ may be combined to form a ring, and $R_{311}$ represents a hydrogen atom or a functional group represented by formula (IX-5):

[Chemical Formula 24]

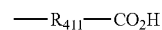 (IX-5)

wherein $R_{411}$ represents a C1-C6 alkylene group, a C6-C10 divalent aromatic hydrocarbon group, a C3-C10 divalent alicyclic hydrocarbon group, a divalent organic group as a combination thereof, or a divalent organic group as a combination of at least one of them and a hetero atom.

In formula (IX-1), $R_{18}$ to $R_{20}$ each independently represents a hydrogen atom, or a hydrocarbon group of 1 to 10 carbon atoms, such as a methyl group, an ethyl group, an n-propyl group, an isopropyl group, an n-butyl group, a sec-butyl group, an isobutyl group, a t-butyl group, a phenyl group, a naphthyl group, or a benzyl group, and $R_{18}$ and $R_{20}$ may be combined to form a ring. $R_{21}$ represents a C1-C6 alkylene group such as a methylene group, an ethylene group, a 1-methylethylene group, or a propylene group, a C6-C10 divalent aromatic hydrocarbon group such as a phenylene group or a naphthylene group, or a divalent alicyclic hydrocarbon group of 3 to 10 carbon atoms, such as a cyclopropylene group, a cyclobutylene group, a cyclohexylene group, a cyclohexylene group, or an adamantanediyl group. Also, $R_{21}$ represents a divalent organic group as a combination of at least two groups of an alkylene group, a divalent aromatic hydrocarbon group and a divalent alicyclic hydrocarbon group. $R_{18}$ to $R_{21}$ may contain a substituent on a proper carbon atom, and specific examples thereof include a halogen atom such as a fluorine atom, a chlorine atom, or a bromine atom; a hydrocarbon group such as a methyl group, an ethyl group, an n-propyl group, a phenyl group, a naphthyl group, or a benzyl group; an acyl group such as an acetyl group or a benzoyl group; a hydrocarbonoxy group such as a nitrile group, a nitro group, a methoxy group, or a phenoxy group; a methylthio group; a methylsulfinyl group; a methylsulfonyl group; an amino group; dimethylamino group; and an anilino group.

Specific examples of the repeating unit represented by formula (IX-1) include those represented by the formulas shown below. Examples of monomers from which the repeating unit represented by formula (IX-1) is induced are described.

[Chemical Formula 25]

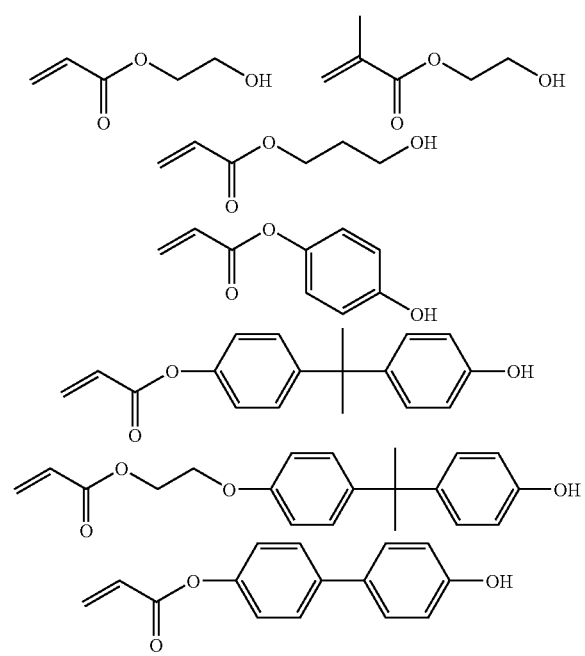

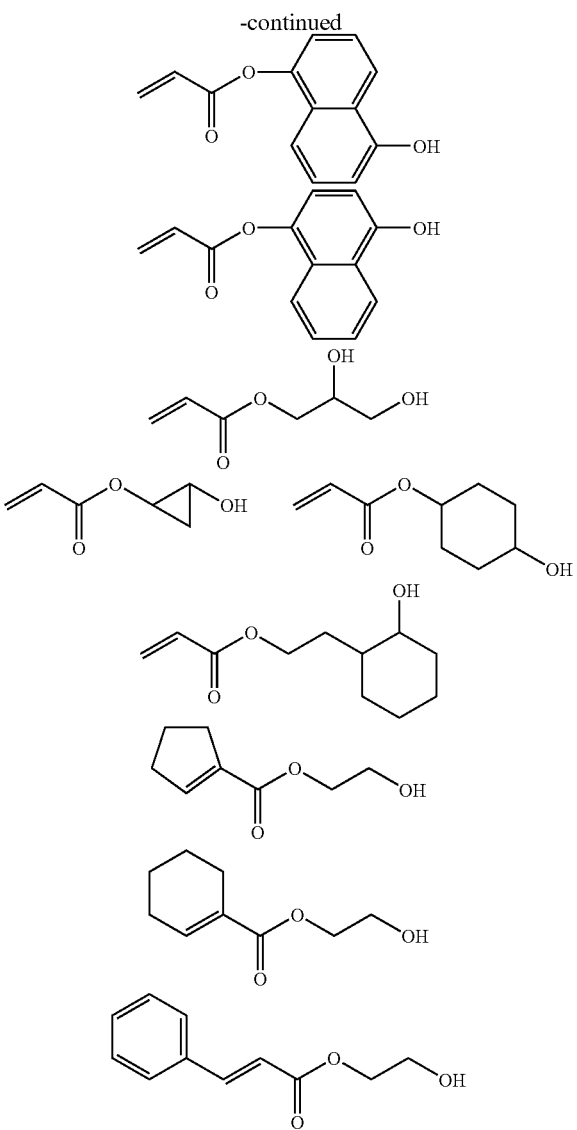

In formula (IX-2), $R_{22}$ to $R_{24}$ each independently represents a hydrogen atom, or a hydrocarbon group of 1 to 10 carbon atoms, such as a methyl group, an ethyl group, an n-propyl group, an isopropyl group, an n-butyl group, a sec-butyl group, an isobutyl group, a t-butyl, a phenyl group, a naphthyl group, or a benzyl group, and p represents any integer from 1 to 3 and the substitution position of a hydroxyl group is not specifically limited. It is possible to have a substituent on carbon on $R_{22}$ to $R_{24}$, and a phenyl group. Specific examples of the substituent include a halogen atom such as a fluorine atom, a chlorine atom, or a bromine atom; a hydrocarbon group such as a methyl group, an ethyl group, an n-propyl group, a phenyl group, a naphthyl group, or a benzyl group; an acyl group such as an acetyl group or a benzoyl group; a hydrocarbonoxy group such as a nitrile group, a nitro group, a methoxy group, or a phenoxy group; a methylthio group; methylsulfinyl group; a methylsulfonyl group; an amino group; a dimethylamino group; and an anilino group.

Specific examples of the repeating unit represented by formula (IX-2) include those represented by the formulas shown below. Examples of monomers from which the repeating unit represented by formula (IX-2) is induced are described.

[Chemical Formula 26]

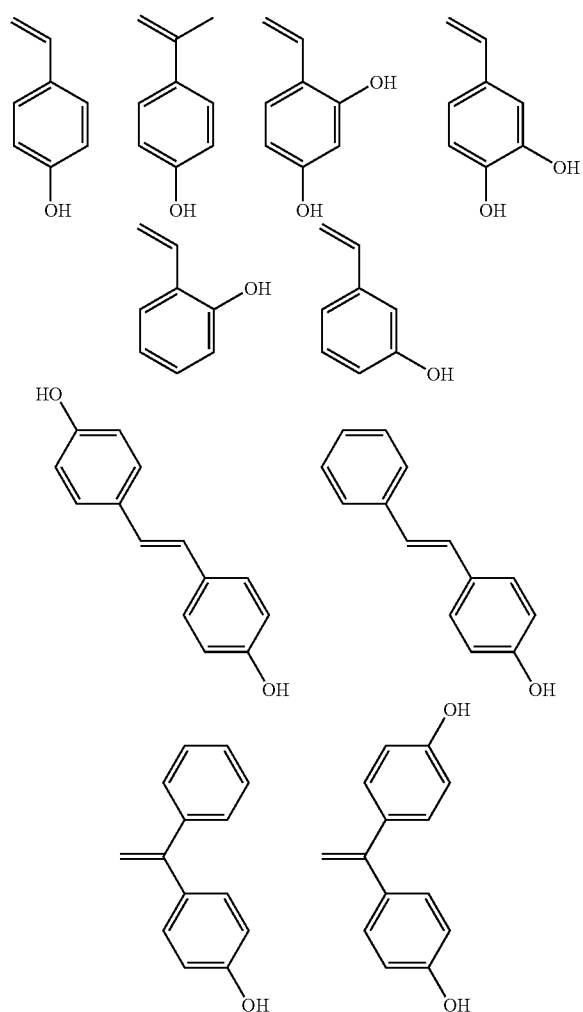

In formula (IX-3), $R_{181}$ $R_{191}$ and $R_{201}$ each independently represents a hydrogen atom, or a hydrocarbon group of 1 to 10 carbon atoms, such as a methyl group, an ethyl group, an n-propyl group, an isopropyl group, an n-butyl group, a sec-butyl group, an isobutyl group, a t-butyl group, a phenyl group, a naphthyl group, or a benzyl group, and $R_{181}$ and $R_{201}$ may be combined to form a ring. $R_{211}$ represents a C1-C6 alkylene group such as a methylene group, an ethylene group, a 1-methylethylene group, or a propylene group; a C6-C10 divalent aromatic hydrocarbon group such as a phenylene group or a naphthylene group; or a divalent alicyclic hydrocarbon group of 3 to 10 carbon atoms, such as a cyclopropylene group, a cyclobutylene group, a cyclohexylene group, or an adamantanediyl group. Also, $R_{211}$ represents a divalent organic group as a combination of at least two groups of an alkylene group, a divalent aromatic hydrocarbon group, and a divalent alicyclic hydrocarbon group. $R_{212}$ represents a hydrogen atom, or a C1-C4 alkyl group such as a methyl group, an ethyl group, an n-propyl group, an isopropyl group, an n-butyl group, a sec-butyl group, an isobutyl group, or a t-butyl group. $R_{181}$, $R_{191}$, $R_{201}$ and $R_{212}$ may have a substituent on a proper carbon atom, and specific examples of the substituent include a halogen atom such as a fluorine atom, a chlorine atom, or a bromine atom; a hydrocarbon group such as a methyl group, an ethyl group, an n-propyl group, a phenyl group, a naphthyl group, or a benzyl group; an acyl group such as an acetyl group or a benzoyl group; a hydrocarbonoxy group such as a nitrile group, a nitro group, a methoxy group, or a phenoxy group; a methylthio group; a methylsulfinyl group; a methylsulfonyl group; an amino group; a dimethylamino group; and an anilino group.

Specific examples of the repeating unit represented by formula (IX-3) include those represented by the formulas shown below. Examples of monomers from which the repeating unit represented by formula (IX-3) is induced are described.

[Chemical Formula 27]

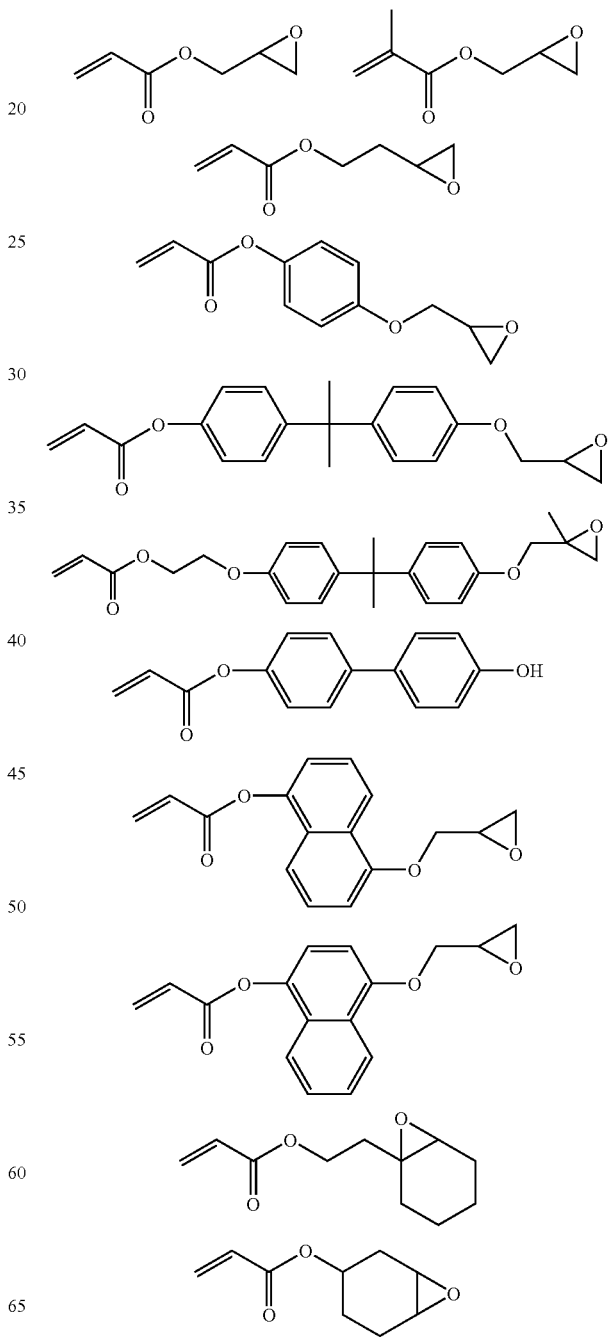

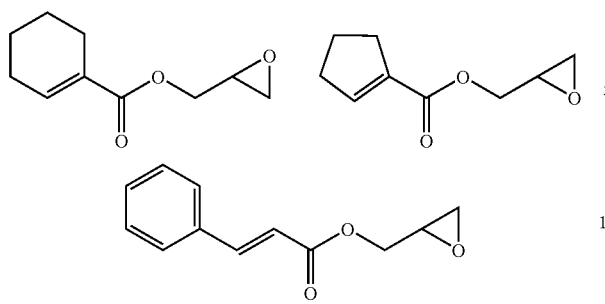

In formula (IX-4), $R_{281}$, $R_{291}$ and $R_{301}$ each independently represents a hydrogen atom, or a hydrocarbon group of 1 to 10 carbon atoms, such as a methyl group, an ethyl group, an n-propyl group, an isopropyl group, an n-butyl group, a sec-butyl group, an isobutyl group, a t-butyl group, a phenyl group, a naphthyl group, or a benzyl group, and $R_{281}$ and $R_{301}$ may be combined to form a ring. $R_{311}$ represents a hydrogen atom or a functional group represented by formula (IX-5). In formula (IX-5), $R_{411}$ represents a C1-C6 alkylene group such as an methylene group, an ethylene group, a 1-methylethylene group, or a propylene group; a C6-C10 divalent aromatic hydrocarbon group such as a phenylene group or a naphthylene group; or a divalent alicyclic hydrocarbon group of 3 to 10 carbon atoms, such as a cyclopropylene group, a cyclobutylene group, a cyclohexylene group, or an adamantanediyl group. Also, $R_{411}$ represents a divalent organic group as a combination of at least two groups of an alkylene group, a divalent aromatic hydrocarbon group and a divalent alicyclic hydrocarbon group. $R_{281}$, $R_{291}$, $R_{301}$, $R_{311}$ and $R_{411}$ may have a substituent on a proper carbon atom, and specific examples of the substituent include a halogen atom such as a fluorine atom, a chlorine atom, or a bromine atom; a hydrocarbon group such as a methyl group, an ethyl group, an n-propyl group, a phenyl group, a naphthyl group, or a benzyl group; an acyl group such as an acetyl group or a benzoyl group; a hydrocarbonoxy group such as a nitrile group, a nitro group, a methoxy group, or a phenoxy group; a methylthio group; a methylsulfinyl group; a methylsulfonyl group; an amino group; a dimethylamino group; and an anilino group.

Specific examples of the repeating unit represented by formula (IX-4) include those represented by the formulas shown below. Examples of monomers from which the repeating unit represented by formula (IX-4) is induced are described.

[Chemical Formula 28]

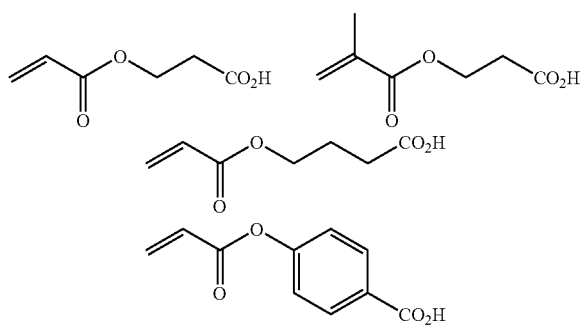

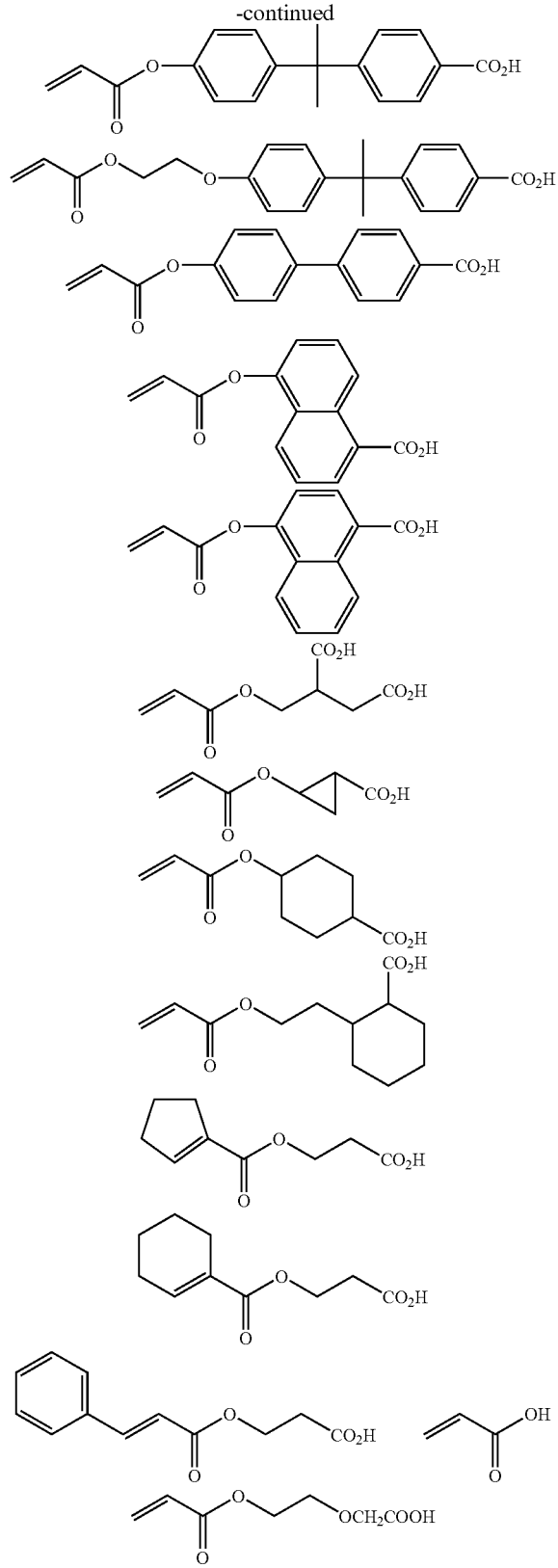

Specific examples of the repeating unit represented by formula (IX) other than the repeating units represented by formula (IX-1) to formula (IX-4) include compounds represented by the formulas shown below.

[Chemical Formula 29]

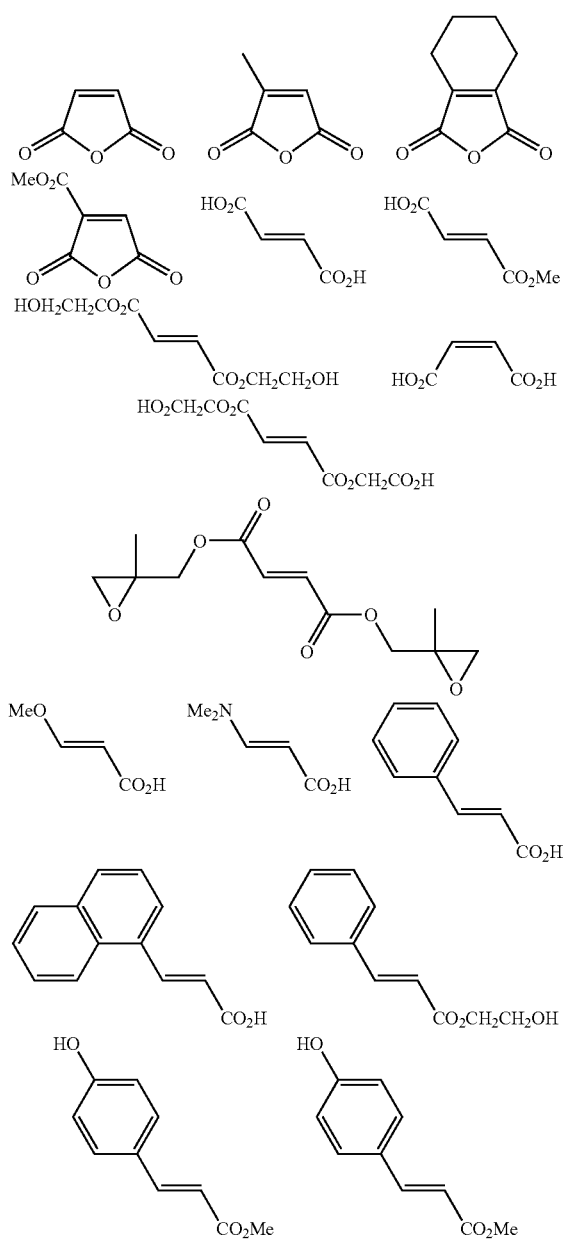

The repeating units represented by formula (IX) may be used alone or in combination.

The number of moles of the repeating unit represented by formula (IX) is not specifically limited as long as a film having sufficient thermal characteristics and physical characteristics can be formed by a crosslinking reaction, but is preferably 5 mols or more.

In the polymer chain A or B in formula (VII), a repeating unit represented by formula (III) and a repeating unit represented by formula (IX) are preferably included at random. The ratio of the repeating unit represented by formula (III) to the repeating unit represented by formula (IX) is not specifically limited, and a molar ratio ((III)/(IX)) is preferably within a range from 1 to 19.

Specific examples of the polymer chain A or B in formula (VII) include preferably the polymer chains shown below.

Formula (XIII):

[Chemical Formula 30]

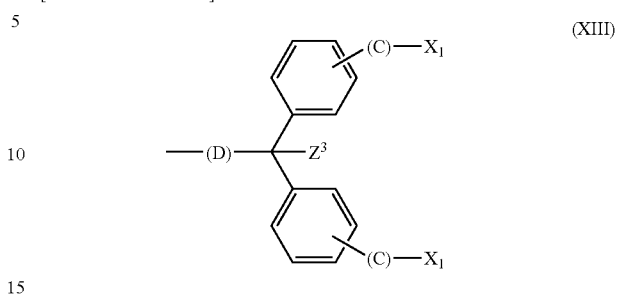

wherein (C) and (D) represent a polymer chain, $X_1$ represents a halogen atom, and $Z^3$ represents a group containing at least one carbon atom Formula (XIV):

[Chemical Formula 31]

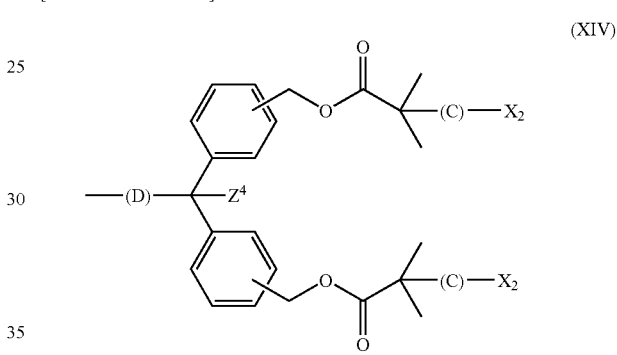

wherein (C) and (D) represents a polymer chain, $X_2$ represents a halogen atom, and $Z^4$ represents a group containing at least one carbon atom Formula (XV):

[Chemical Formula 32]

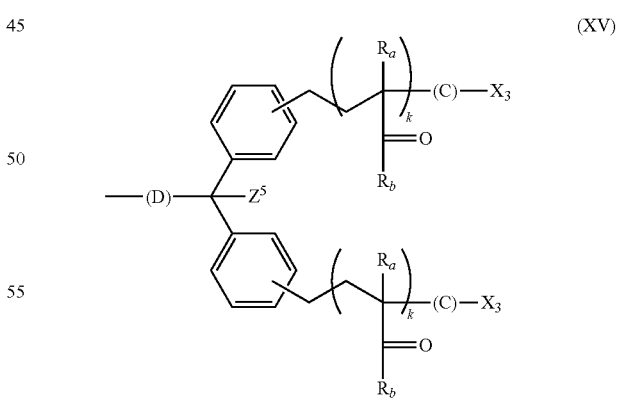

wherein (C) and (D) represent a polymer chain, $X_3$ represents a halogen atom, $R_a$ represents a hydrogen atom or a C1-C6 alkyl group, $R_b$ represents an organic group, $Z_5$ represents a group containing at least one carbon atom, and k represents any integer of 1 or more In formulas (XIII) to (XV), the polymer chain (C) is preferably a polymer containing formula (III), preferably a copolymer of repeating units represented by formula (III) and formula (IX), and more preferably a copolymer containing both repeating units at random. The polymer chain (D) is preferably a polymer chain derived from a monomer containing a polymerizable double bond, and particularly preferably a polymer chain containing a repeating unit represented by formula (X).

[Chemical Formula 33]

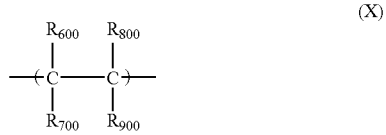

wherein $R_{600}$ to $R_{800}$ each independently represents a hydrogen atom or a C1-C10 hydrocarbon group, and $R_{900}$ represents an aryl group or a heteroaryl group The polymer chain (D) may be a repeating structure having a kind of single structure, or block repeating structure or random repeating structure having two or more kinds of structures.

In the repeating unit (X), $R_{600}$ to $R_{800}$ each independently represents a hydrogen atom or a C1-C10 hydrocarbon group. Examples of the C1-C10 hydrocarbon group include the same groups as those described above. $R_{900}$ represents an aryl group or a heteroaryl group, and specific examples thereof include an aryl group such as a substituted or non-substituted phenyl group, a substituted or non-substituted naphthyl group, or a substituted or non-substituted anthracenyl group; and a heteroaryl group such as a 2-pyridyl group or a 4-pyridyl group. Of these groups, an aryl group is preferable, and a phenyl group, a p-(1-ethoxyethoxy)phenyl group and a p-tert-butoxyphenyl group are particularly preferable in view of reactivity. h represents any integer of 20 to 300, and preferably any integer of 30 to 150.

$R_{600}$ to $R_{900}$ may have a substituent on a proper carbon atom. Examples of the substituent include a halogen atom such as a fluorine atom, a chlorine atom, or a bromine atom; a hydrocarbon group such as a methyl group, an ethyl group, an n-propyl group, a phenyl group, a naphthyl group, or a benzyl group; an acyl group such as an acetyl group or a benzoyl group; a cyano group; a nitro group; a hydrocarbonoxy group such as a methoxy group or a phenoxy group; an alkylthio group such as a methylthio group; an alkylsulfinyl group such as a methylsulfinyl group; an alkylsulfonyl group such as a methylsulfonyl group; an amino group in which an amino group or a dimethylamino group may be substituted; and an anilino group.

When the polymer chain constituting the arm portion contains a repeating unit (III) and a repeating unit (X), the polymer chain constituting the arm portion preferably contains 40 to 95% by weight of the repeating unit (III) and 5 to 60% by weight of the repeating unit (X), and more preferably 55 to 85% by weight of the repeating unit (III) and 15 to 45% by weight of the repeating unit (X).

When the polymer chain further contains a repeating unit (IX), the polymer chain preferably contains 40 to 85% by weight of the repeating unit (III), 5 to 15% by weight of the repeating unit (IX) and 10 to 50% by weight of the repeating unit (X), and more preferably 55 to 75% by weight of the repeating unit (III), 5 to 15% by weight of the repeating unit (IX) and 20 to 40% by weight of the repeating structure (X).

The number average molecular weight of the polymer chain constituting the arm portion of the star polymer of the present invention is not specifically limited, and is from 5000 to 1,000,000 in terms of the polystyrene equivalent number average molecular weight determined using gel permeation chromatography, and the ratio of the weight average molecular weight (Mw) to the number average molecular weight (Mn), (Mw/Mn) (molecular weight distribution), is preferably within a range from 1.01 to 1.30.

The number average molecular weight (Mn) of the star polymer of the present invention is not specifically limited. According to the present invention, a narrow distribution star polymer can be obtained regardless of a low molecular weight. For example, it is possible to obtain a star polymer which has a number average molecular weight (Mn) of 1,000,000 or less and the ratio of the weight average molecular weight (Mw) to the number average molecular weight (Mn), (Mw/Mn) (molecular weight distribution), within a range from 1.01 to 1.30

The fourth invention of the present invention pertains to a method for producing a star polymer of the present invention. Namely, the fourth invention of the present invention pertains to a method for producing a star polymer, which comprises reacting a compound containing a functional group capable of reacting with an anion, which serves as a core portion, with a polymer chain containing two or more functional groups having an anion end which serves as an arm portion. According to the method of the present invention, a narrow distribution star polymer can be obtained simply and surely. Also, according to the method of the present invention, a star polymer of the present invention can be preferably produced.

Two or more functional groups capable of reacting with a polymer anion end preferably exist at the portion serving as a core. Specific examples of the functional group include a halogen atom, an ester group, a formyl group, an acyl group, a nitrile group, and an imino group, of which an ester group is preferable. Examples of the compound containing the functional group include, but are not limited to, a chain or cyclic aliphatic compound, an aromatic compound, and a heterocyclic compound, of which an aromatic compound is preferable.

Specific examples of the aromatic compound capable of serving as a core include compounds represented by the formulas shown below. An ester group is described as a typical functional group, but the functional group is not limited thereto.

Formula (XVII):

[Chemical Formula 34]

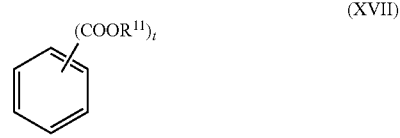

Formula (XVIII):

[Chemical Formula 35]

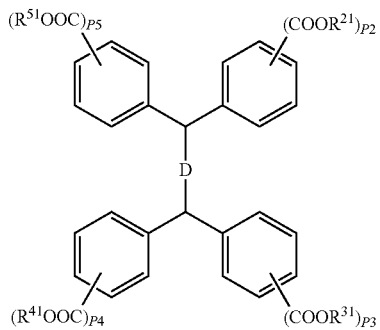

In formula (XVII), $R^{11}$ represents a C1-C6 alkyl group, and examples thereof include a methyl group, an ethyl group, an n-propyl group, an isopropyl group, an n-butyl group, a t-butyl group, an n-pentyl group, and an n-hexyl group. t represents an integer of 2 to 6, and preferably an integer of 2 to 4. In formula (XVIII), $R^{21}$ to $R^{11}$ each independently represents a C1-C6 alkyl group and specific examples thereof include the same groups as those of $R^{11}$. p2 to p5 each independently represents an integer of 1 to 5, and preferably an integer of 1 to 2. D represents $(CH_2)_q$ or a p-phenylene group, and q represents an integer of 0 to 3.

Specific examples of the compound other than those described above include compounds shown below. Although the same as $R^{11}$ can be used as the ester portion, an ethyl group was described as a typical one for convenience.

[Chemical Formula 36]

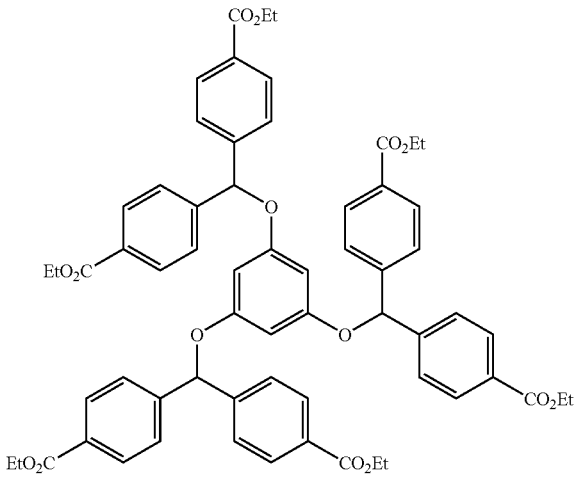

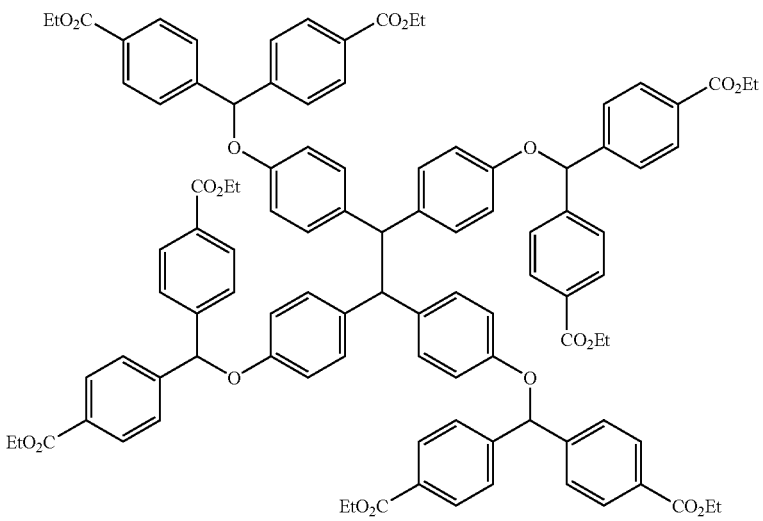

-continued

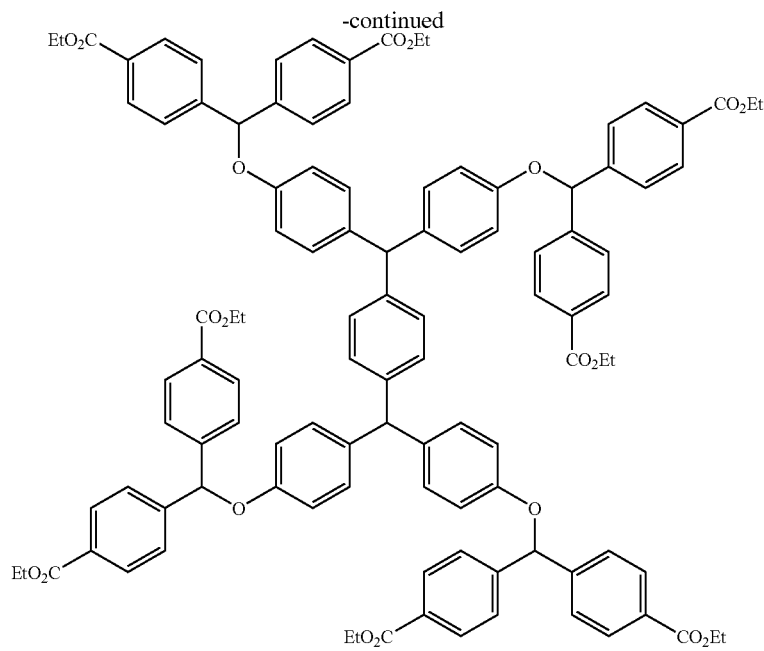

The polymerization reaction for synthesis of the arm polymer can be performed using a known living anionic polymerization method. Examples of the polymerization form of the arm polymer include a polymer composed of a single component (monomer) and a copolymer composed of two or more components (monomer), and examples of the copolymer include a random copolymer in which the respective components are statistically distributed in the entire copolymer chain, a partial block copolymer, and a complete block copolymer, which can be synthesized by selecting an addition method of the monomer to be used.

The reaction of producing a star polymer using the resulting arm polymer as a branched polymer chain can be performed by adding a compound containing a functional group capable of reacting with anions serving as a core portion in a reaction solution after the completion of the arm polymer synthesis reaction. Also, the arm polymer synthesized can be added in a solution of the compound containing a functional group capable of reacting with anions serving as a core portion. In this reaction, a polymer having a narrow molecular weight distribution can be obtained by controlling the structure due to a polymerization reaction under an inert gas atmosphere such as nitrogen or argon in an organic solvent at a temperature within a range from −100 to 50° C., and preferably from −70° C. to 30° C. The reaction for production of a star polymer can be continuously performed in a solvent used to form an arm polymer, or performed by adding a solvent and varying the composition, or replacing the solvent by another solvent. As the solvent, the same solvent as that used in the synthesis reaction of the arm polymer can be used.

In the method for producing a star polymer in the present invention, the proportion of the compound containing a functional group capable of reacting with anions and the polymer containing an anionic polymerization active end can be appropriately selected according to the number (D) of active ends of the polymer having an anionic polymerization active end and the number (P) of functional groups capable of reacting with anions. It is preferred that these components are preferably added so that (D) is one or more times the theoretical reaction equivalent of (P). For example, when the functional group is an ester group, since the ester group is reacted with the anionic active end in a ratio of 1:2, these components are preferably added so that (D) is 2 times larger than (P).

According to the method of the present invention, star polymer having a low molecular weight and narrow distribution can be obtained. For example, it is possible to obtain a star polymer which has a number average molecular weight (Mn) of 1,000,000 or less and the ratio of the weight average molecular weight (Mw) to the number average molecular weight (Mn), (Mw/Mn) (molecular weight distribution), within a range from 1.001 to 2.50, more preferably from 1.001 to 1.50, and particularly preferably from 1.01 to 1.30.

The polymer chain having an anionic active end used in the method of the present invention is a polymer chain which preliminarily contains two or more functional groups at the end. The method for producing a polymer chain is not specifically limited and the polymer chain can also be produced by a method of introducing a functional group into the end after the completion of the polymerization reaction. It is preferred to perform the polymerization reaction using a polymerization initiator into which two or more functional groups are preliminarily introduced.

Specific examples of the polymerization initiator include compounds obtained by reacting the compounds shown below with an alkali metal or an organic alkali metal.

[Chemical Formula 37]

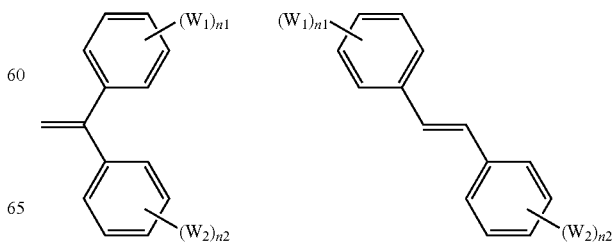

-continued

[chemical structures showing vinyl-substituted phenyl groups with $(W_1)_{n1}$ and $(W_2)_{n2}$ substituents, linked via $CO_2$ and ester groups]

In the formula, $W_1$ and $W_2$ are not specifically limited as long as each $W_1$ and $W_2$ independently represents a functional group which does not inhibit polymerization and can serve as a polymerization initiation point by optionally performing functional group conversion after polymerization, or a functional group which can be converted into a functional group capable of reacting with an anion end of a polymer. Specific examples thereof include a silyloxy group such as a trimethylsilyloxy group, a t-butyldimethylsilyloxy group, or a dimethylphenylsilyloxy group; an aryloxy group such as a phenoxy group or a naphthoxy group; an alkoxy group such as a t-butoxy group, a methoxy group, an ethoxy group, a 1-methoxyethoxy group, or a 1-methoxymethoxy group; a trimethylsilyloxymethyl group; a 2-trimethylsilyloxyethyl group; a methoxymethyl group; a t-butoxymethyl group; a 1-ethoxyethoxymethyl group; and a t-butoxycarbonyl group, of which a silyl group is preferable taking account of variety of functional group conversion.

Conversion of the functional group at the end of the arm portion can be performed by a conventionally known method.

As the method of performing living radical polymerization of a star polymer having a functional group at an outermost end of an arm portion (hereinafter abbreviated to star polymer (Y)) and a monomer such as a (meth)acrylate ester, for example, (A) a living radical polymerization method in which a polymerization reaction is performed using a star polymer (Y) as a polymerization initiator and using a transition metal complex as a catalyst or (B) a living radical polymerization method using a stable radical-based initiator can be performed using a known method.

Examples of the method of forming an arm portion by a living radical polymerization method include:

(1) a method of forming an arm portion made of a homopolymer by using one kind of compound containing a living radical polymerizable unsaturated bond, (2) a method of forming an arm portion made of a random copolymer by simultaneously adding plural compounds containing a living radical polymerizable unsaturated bond to a reaction system, (3) a method of forming an arm portion made of a block copolymer by sequentially adding plural compounds containing a living radical polymerizable unsaturated bond to a reaction system, and (4) a method of forming an arm portion made of a gradient copolymer by varying the composition ratio of plural compounds containing a living radical polymerizable unsaturated bond with time.

The polymerization method is not specifically limited and, for example, a bulk polymerization method, a solution polymerization method, a suspension polymerization method, or an emulsion polymerization method can be employed, and a solution polymerization method is preferable.

When the solution polymerization method is employed, the star polymer (Y), a compound containing a polymerizable unsaturated bond, a transition metal complex and, if necessary, a Lewis acid and/or amines are mixed in an organic solvent, followed by stirring with heating, and thus the objective star polymer can be obtained.

As described above, the star polymer of the present invention is a narrow distribution star polymer having a controlled molecular structure and can be preferably used as electrochemical materials of batteries, solar batteries, capacitors, sensors, condensers, light emitting elements, semiconductor light emitting elements, light emitting diodes, light modulation elements, organic FET elements, display elements such as liquid crystal display and EL display, EC elements, switching elements, and photoelectric transducers; inclusion materials; and functional materials of electric appliances and industrial equipment. Because of the specific three-dimensional structure and very narrow molecular weight distribution, unique physicochemical properties can be expected and thus the star polymer can be applied to various fields such as coating, drug delivery systems, supra molecular chemistry and nanotechnology. In the fields of electric and optical functions, since the star polymer of the present invention enables a hydrophilic moiety and a hydrophobic moiety to exist in a desired length in an arm portion, the resulting phase separation structure can form a microphase separation structure and can control the size of a domain. Thus, application of the star polymer to lithographic materials, pattern formation materials, nanopattern formation materials, high density recording media such as patterned media, magnetic materials, magnetic recording materials, and resist materials is expected. Since the star polymer of the present invention is in the form of nanoparticles, it is possible to produce a nanocomposite with functional nanoparticles of other fluorescent materials, semiconductors and metals, or a thin film thereof. Furthermore, the star polymer can be applied to memory materials, thin film materials for sensors and various display elements, and various surface treating agents. In the biological field, the star polymer can be applied to released carriers utilizing amphiphilicity, namely, hydrophilicity and hydrophobicity of an arm portion, encapsulation of drugs, nanocarriers, and contrast media such as MRI. In the fields of inks, coating materials and coatings, the star polymer can be applied to coating materials and resins or additives for inks, electrophotographic binders or transfer materials utilizing sharp-melt properties, and antistatic agents utilizing hydrophilicity and hydrophobicity, soil-resist agents and surface/interfacer modifiers. In general fields, the star polymer can be applied to organic inorganic hybrid materials, porous materials (adsorbents, catalyst carriers, gas permeation films or filters) containing controlled pores using the star polymer as a mold, ultrathin films arranged through control utilizing hydrophilicity and hydrophobicity, and cosmetics. Particularly, the star polymer including a random repeating structure (C) in the arm portion of the present invention is useful as adhesive compositions (adhesives), binder compositions (binders for the production of an electrode) for production of electrodes, and compositions for a solid electrolyte.

The functional material using the star polymer of the present invention preferably contains a metal salt. It is possible to improve conductivity and to further improve adhesive strength by including the metal salt together with the star polymer. The metal salt is not specifically limited and is preferably an electrolyte salt. Examples of the electrolyte salt include an alkali metal salt, a quaternary ammonium salt such as $(CH_3)_4NBF_6$, a quaternary phosphonium salt such as $(CH_3)_4PBF_6$, a transition metal salt such as $AgClO_4$, and proton acid such as hydrochloric acid, perchloric acid, or fluoboric acid. Of these electrolyte salts, an alkali metal salt, a quaternary ammonium salt, a quaternary phosphonium salt or a transition metal salt is preferable, and an alkali metal salt is more preferable. Plural kinds of metal salts may be used in combination.

Specific examples of the alkali metal salt include $LiCF_3SO_3$, $LiN(CF_3SO_2)_2$, $LiC(CF_3SO_2)_3$, $LiC(CH_3)(CF_3SO_2)_2$, $LiCH(CF_3SO_2)_2$, $LiCH_2(CF_3SO_2)$, $LiC_2F_5SO_3$, $LiN(C_2F_5SO_2)_2$, $LiB(CF_3SO_2)_2$, $LiPF_6$, $LiClO_4$, $LiI$, $LiBF_4$, $LiSCN$, $LiAsF_6$, $NaCF_3SO_3$, $NaPF_6$, $NaClO_4$, $NaI$, $NaBF_4$, $NaAsF_6$, $KCF_3SO_3$, $KPF_6$, $KI$, $LiCF_3CO_3$, $NaClO_3$, $NaSCN$, $KBF_4$, $Mg(ClO_4)_2$, and $Mg(BF_4)_2$, of which a lithium salt is particularly preferable.

The functional material using the star polymer of the present invention may contain crosslinking agents, fillers, sensitizers, and storage stabilizers. Examples of the crosslinking agent include a polyisocyanate compound containing two or more isocyanate groups in the molecule, and a polyepoxy compound containing two or more epoxy groups in the molecule. Examples of the sensitizer include urea, a nitrile compound (N,N-disubstituted-P-aminobenzonitrile, etc.), and a phosphorus compound (tri-n-butylphosphine, etc.). Examples of the storage stabilizer include quaternary ammonium chloride, benzothiazole, and hydroquinone.

The adhesive using the star polymer of the present invention has high adhesion to a plastic such as an olefin resin, metal, an inorganic compound, ceramics, and a coating substrate thereof, and also has high conductivity and high film strength. Also, the adhesive of the present invention is excellent in solvent resistance and can be used in a solvent. Because of these properties, the adhesive of the present invention can be preferably used for a battery regardless of a solid battery and a liquid battery.

Also, the binder for the production of an electrode using the star polymer of the present invention can be used to hold an electrode active material on the surface of a current collector and is excellent in binding of electrode active materials and binding with the current collector. The binder also has high conductivity and has high film strength. Furthermore, the binder of the present invention is also excellent in electrolytic solution resistance and can be preferably used regardless of a solid battery or a liquid battery. The binder does not contract with heat and is therefore capable of sufficiently enduring a temperature rise during the use of the battery.

The composition for a solid electrolyte using the star polymer of the present invention can be preferably used as a solid electrolyte layer of a solid electrolyte battery comprising a positive electrode, a negative electrode and a composition layer for a solid electrolyte. A polymer solid electrolyte battery can be obtained by interposing a solid electrolyte sheet between a positive electrode and a negative electrode. The solid electrolyte of the present invention has excellent mechanical strength which enables formation of a self-supporting film, and also has excellent ionic conductivity over a wide temperature range. The solid electrolyte is also excellent in solvent resistance and can be used after being impregnated with an electrolytic solution.

EXAMPLES

The present invention will now be described in more detail by way of examples, but the technical scope of the present invention is not limited to these examples.

Example 1

Synthesis of Arm

In a nitrogen-substituted 300 mL four-necked flask, 11.6 g of dehydrated tetrahydrofuran (hereinafter abbreviated to THF) and 102.0 g of dehydrated toluene were charged and a reaction system was maintained at −40° C. under stirring. To the reaction system, 2.77 g (6.5 mmol) of an n-butyl lithium/hexane 1.6 mol/L solution was added. After 5 minutes, 22.0 g (210.8 mmol) of styrene was added and polymerization was performed. 20 minutes after the completion of dropwise addition, sampling was performed and the completion of the polymerization was confirmed by gas chromatography (hereinafter abbreviated to GC). The analysis of the polymer solution by gel permeation chromatography (hereinafter abbreviated to GPC) revealed that the polymer solution contains a unimodal polymer having a molecular weight Mn of 3,500 and a dispersion degree Mw/Mn of 1.056.

Star Reaction

In the reaction system, 0.26 g (0.88 mmol) of triethyl-1,3,5-benzenetricarboxylate dissolved in 5 ml of dehydrated THF was added. The reaction was continued for 30 minutes and then terminated using methanol. The polymer solution was poured into a large amount of methanol to precipitate a polymer, which was collected by filtration, washed and then dried under vacuum at 50° C. for 5 hours to obtain 20.7 g (yield: 94%) of a yellow powdered polymer.

Using preparative GPC, an excess amount of an arm polymer was removed to obtain a white powdered star polymer. The analysis of the polymer by GPC revealed that the polymer is a unimodal polymer having a molecular weight Mn of 14,200 and a dispersion degree Mw/Mn of 1.053. Measurement by a multiple-angle light scattering detector (hereinafter abbreviated to GPC-MALLS) revealed that the polymer has a molecular weight Mw of 17,600 and a dispersion degree Mw/Mn of 1.002.

Example 2

Synthesis of Arm

In a nitrogen-substituted 300 mL four-necked flask, 11.2 g of dehydrated THF and 96.7 g of dehydrated toluene were added and a reaction system was maintained at −40° C. under stirring. To the reaction system, 2.58 g (6.1 mmol) of an n-butyl lithium/hexane (1.6 mol/L) solution was added. After 5 minutes, 19.7 g (111.8 mmol) of p-tert-butoxystyrene was added and polymerization was performed. 45 minutes after the completion of dropwise addition, sampling was performed and the completion of the polymerization was confirmed by GC. The analysis of the polymer solution by GPC revealed that the polymer solution contains a unimodal polymer having a molecular weight Mn of 3,900 and a dispersion degree Mw/Mn of 1.112.

Star Reaction

After maintaining the reaction system at −20° C., 0.27 g (0.92 mmol) of triethyl-1,3,5-benzenetricarboxylate dissolved in 5 ml of dehydrated THF was added. The reaction was continued for 30 minutes and then terminated using methanol. The polymer solution was poured into a large amount of methanol/water of 1/1 (v/v) to precipitate a polymer, which was collected by filtration, washed and then dried under vacuum at 50° C. for 5 hours to obtain 10.9 g (yield: 55%) of an orange powdered polymer.

Using preparative GPC, an excess amount of an arm polymer was removed to obtain a white powdered star polymer. The analysis of the polymer by GPC revealed that the polymer is a unimodal polymer having a molecular weight Mn of 12,300 and a dispersion degree Mw/Mn of 1.095. Measurement by GPC-MALLS revealed that the polymer has a molecular weight Mw of 21,000 and a dispersion degree Mw/Mn of 1.000.

Example 3

Synthesis of Arm

In a nitrogen-substituted 300 mL four-necked flask, 11.9 g of dehydrated THF and 103.4 g of dehydrated toluene were added and a reaction system was maintained at −40° C. under stirring. To the reaction system, 2.73 g (6.4 mmol) of an n-butyl lithium/hexane (1.6 mol/L) solution was added. After 5 minutes, 20.7 g (198.8 mmol) of styrene was added to the reaction system and polymerization was performed. 20 minutes after the completion of dropwise addition, sampling was performed and the completion of the polymerization was confirmed by GC. The analysis of the polymer solution by GPC revealed that the polymer solution contains a unimodal polymer having a molecular weight Mn of 3,300 and a dispersion degree Mw/Mn of 1.063.

Star Reaction

In the reaction system, 0.37 g (0.59 mmol) of 1,1,2,2-tetrakis-(4-ethoxycarbonylphenyl)ethane dissolved in 5 ml of dehydrated THF was added. The reaction was continued for 30 minutes and then terminated using methanol. The polymer solution was poured into a large amount of methanol to precipitate a polymer, which was collected by filtration, washed and then dried under vacuum at 50° C. for 5 hours to obtain 20.5 g (yield: 99%) of a white powdered polymer.

Using preparative GPC, an excess amount of an arm polymer was removed to obtain a white powdered star polymer. The analysis of the polymer by GPC revealed that the polymer is a unimodal polymer having a molecular weight Mn of 19,500 and a dispersion degree Mw/Mn of 1.016. Measurement by GPC-MALLS revealed that the polymer has a molecular weight Mw of 30,200 and a dispersion degree Mw/Mn of 1.000.

Example 4

Synthesis of Arm

In a nitrogen-substituted 300 mL four-necked flask, 11.5 g of dehydrated THF and 103.6 g of dehydrated toluene were added and a reaction system was maintained at −40° C. under stirring. To the reaction system, 1.17 g (2.8 mmol) of an n-butyl lithium/hexane (1.6 mol/L) solution was added. After 5 minutes, 20.4 g (195.7 mmol) of styrene was added to the reaction system and polymerization was performed. 20 minutes after the completion of dropwise addition, sampling was performed and the completion of the polymerization was confirmed by GC. The analysis of the polymer solution by GPC revealed that the polymer solution contains a unimodal polymer having a molecular weight Mn of 7,970 and a dispersion degree Mw/Mn of 1.057.

Star Reaction

In the reaction system, 0.16 g (0.25 mmol) of 1,1,2,2-tetrakis-(4-ethoxycarbonylphenyl)ethane dissolved in 5 ml of dehydrated THF was added. The reaction was continued for 30 minutes and then terminated using methanol. The polymer solution was poured into a large amount of methanol to precipitate a polymer, which was collected by filtration, washed and then dried under vacuum at 50° C. for 5 hours to obtain 20.2 g (yield: 99%) of a white powdered polymer.

Using preparative GPC, an excess amount of an arm polymer was removed to obtain a white powdered star polymer. The analysis of the polymer by GPC revealed that the polymer is a unimodal polymer having a molecular weight Mn of 43,000 and a dispersion degree Mw/Mn of 1.022. Measurement by GPC-MALLS revealed that the polymer has a molecular weight Mw of 72,200 and a dispersion degree Mw/Mn of 1.001.

Example 5

Synthesis of Arm

In a nitrogen-substituted 300 mL four-necked flask, 10.7 g of dehydrated THF and 98.6 g of dehydrated toluene were added and a reaction system was maintained at −35° C. under stirring. To the reaction system, 2.39 g (5.6 mmol) of an n-butyl lithium/hexane (1.6 mol/L) solution was added. After 5 minutes, 19.8 g (112.3 mmol) of p-tert-butoxystyrene was added to the reaction system and polymerization was performed. 40 minutes after the completion of dropwise addition, sampling was performed and the completion of the polymerization was confirmed by GC. The analysis of the polymer solution by GPC revealed that the polymer solution contains a unimodal polymer having a molecular weight Mn of 4,150 and a dispersion degree Mw/Mn of 1.10.

Star Reaction

In the reaction system, 0.32 g (0.51 mmol) of 1,1,2,2-tetrakis-(4-ethoxycarbonylphenyl)ethane dissolved in 5 ml of dehydrated THF was added. The reaction was continued for 30 minutes and then terminated using methanol. The polymer solution was poured into a large amount of methanol/water to precipitate a polymer, which was collected by filtration, washed and then dried under vacuum at 50° C. for 5 hours to obtain 18.2 g (yield: 92%) of a white powdered polymer.

Using preparative GPC, an excess amount of an arm polymer was removed to obtain a white powdered star polymer. The analysis of the polymer by GPC revealed that the polymer is a unimodal polymer having a molecular weight Mn of 15,200 and a dispersion degree Mw/Mn of 1.058. Measurement by GPC-MALLS revealed that the polymer has a molecular weight Mw of 30,800 and a dispersion degree Mw/Mn of 1.008.

Example 6

Synthesis of Arm

In a nitrogen-substituted 300 mL four-necked flask, 10.8 g of dehydrated THF and 102.4 g of dehydrated toluene were added and a reaction system was maintained at −35° C. under stirring. To the reaction system, 2.09 g (4.9 mmol) of an n-butyl lithium/hexane (1.6 mol/L) solution was added. After 5 minutes, 18.0 g (102.1 mmol) of p-tert-butoxystyrene was added to the reaction system and polymerization was performed. 30 minutes after the completion of dropwise addition, sampling was performed and the completion of the polymerization was confirmed by GC. The analysis of the polymer solution by GPC revealed that the polymer solution contains a unimodal polymer having a molecular weight Mn of 4,450 and a dispersion degree Mw/Mn of 1.07.

Star Reaction

In the reaction system, 0.31 g (0.50 mmol) of 1,1,2,2-tetrakis-(4-ethoxycarbonylphenyl)ethane dissolved in 5 ml of dehydrated THF was added. The reaction was continued for 30 minutes and then terminated using methanol. The polymer solution was poured into a large amount of methanol/water to precipitate a polymer, which was collected by filtration, washed and then dried under vacuum at 50° C. for 5 hours to obtain 19.3 g (yield: 97%) of a white powdered polymer.

Using preparative GPC, an excess amount of an arm polymer was removed to obtain a white powdered star polymer. The analysis of the polymer by GPC revealed that the polymer is a unimodal polymer having a molecular weight Mn of 20,300 and a dispersion degree Mw/Mn of 1.047. Measurement by GPC-MALLS revealed that the polymer has a molecular weight Mw of 39,200 and a dispersion degree Mw/Mn of 1.000.

When the number of arms was calculated by the equation Number of arms (f)=Star Mw (MALLS value)/Arm Mw (GPC value), the number of arms f was 6.7 in Example 5 and the number of arms f was 8.2 in Example 6. The results reveal that styrene anions have strong nucleophilic attack and attack an ester group more surely.

Example 7

Synthesis of Arm

In a nitrogen-substituted 300 mL four-necked flask, 11.9 g of dehydrated THF and 102.4 g of dehydrated toluene were added and a reaction system was maintained at −35° C. under stirring. To the reaction system, 2.53 g (5.9 mmol) of an n-butyl lithium/hexane (1.6 mol/L) solution was added. After 5 minutes, 21.5 g (112.0 mmol) of p-(1-ethoxyethoxy)styrene was added to the reaction system and polymerization was performed. 60 minutes after the completion of dropwise addition, sampling was performed and the completion of the polymerization was confirmed by GC. The analysis of the polymer solution by GPC revealed that the polymer solution contains a unimodal polymer having a molecular weight Mn of 4,300 and a dispersion degree Mw/Mn of 1.094.

Star Reaction

In the reaction system, 0.22 g (0.75 mmol) of triethyl 1,3,5-benzenetricarboxylate dissolved in 5 ml of dehydrated THF was added. The reaction was continued for 30 minutes and then terminated using methanol. The polymer solution was poured into a large amount of methanol to precipitate a polymer, which was collected by filtration, washed and then dried under vacuum at 50° C. for 5 hours to obtain 16.1 g (yield: 75%) of a yellow powdered polymer.

Using preparative GPC, an excess amount of an arm polymer was removed to obtain a white powdered star polymer. The analysis of the polymer by GPC revealed that the polymer is a unimodal polymer having a molecular weight Mn of 11,400 and a dispersion degree Mw/Mn of 1.117. Measurement by GPC-MALLS revealed that the polymer has a molecular weight Mw of 19,000 and a dispersion degree Mw/Mn of 1.012.

Example 8

Synthesis of 1,3,5-tris(bis(4-ethoxycarbonylphenyl)methoxy)benzene

In a dried round bottom flask equipped with a stirring blade, 29.1 g (74 mmol) of bis(4-ethoxycarbonylphenyl)bromoethane, 3.0 g (24 mmol) of 1,3,5-trihydroxybenzene, 15.7 g (113 mmol) of potassium carbonate ($K_2CO_3$) and 350 ml of acetone were charged, followed by mixing with stirring. The mixed solution was heated at reflux temperature for 24 hours. The reaction solution was cooled to room temperature and the undissolved inorganic salt was recovered. The solvent was recovered under reduced pressure and the crude product was isolated using column chromatography (silica gel (75 to 150 μm), hexane/ethylacetone (2:1 v/v)). After the solvent was recovered under reduced pressure, the residue was recrystallized from chloroform/hexane to obtain 10.4 g (yield: 52%) of a white powdered crystal.

Synthesis of Arm

In a nitrogen-substituted 300 mL four-necked flask, 17.5 g of dehydrated THF and 153.7 g of dehydrated toluene were added and a reaction system was maintained at −40° C. under stirring. To the reaction system, an n-butyl lithium 1.6 g (3.9 mmol)/hexane solution was added. After 5 minutes, 30.8 g (295.7 mmol) of styrene was added to the reaction system and polymerization was performed. 20 minutes after the completion of dropwise addition, sampling was performed and the completion of the polymerization was confirmed by GC. The analysis of the polymer solution by GPC revealed that the polymer solution contains a unimodal polymer having a molecular weight Mn of 8,900 and a dispersion degree Mw/Mn of 1.03.

Star Reaction

In the reaction system, 5 ml of a 1,3,5-tris(bis(4-ethoxycarbonylphenyl)methoxy)benzene 0.26 g (0.25 mmol)/THF solution dissolved in 5 ml of dehydrated THF was added. The reaction was continued for 30 minutes and then terminated using methanol. The polymer solution was poured into a large amount of methanol to precipitate a polymer, which was collected by filtration, washed and then dried under vacuum at 50° C. for 5 hours to obtain a white powdered polymer.

Using preparative GPC, an excess amount of an arm polymer was removed to obtain a white powdered star polymer. The analysis of the polymer by GPC revealed that the polymer is a unimodal polymer having a molecular weight Mn of 50,300 and a dispersion degree Mw/Mn of 1.02. Measurement by GPC-MALLS revealed that the polymer has a molecular weight Mw of 110,000.

Example 9

Synthesis of α,α,α',α'-tetrakis-(4-(bis(4-ethoxycarbonylphenyl)methoxyphenyl))p-xylene In a dried round bottom flask equipped with a stirring blade, 29.1 g (74 mmol) of bis(4-ethoxycarbonylphenyl)bromoethane, 8.4 g (18 mmol) of α,α,α',α'-tetrakis-(4-hydroxyphenyl)p-xylene, 15.7 g (113 mmol) of potassium carbonate ($K_2CO_3$) and 350 ml of acetone were charged, followed by mixing with stirring. The mixed solution was heated at reflux temperature for 24 hours. The reaction solution was cooled to room temperature and the undissolved inorganic salt was recovered. The solvent was recovered under reduced pressure and the crude product was isolated using column chromatography (silica gel (75 to 150 μm), hexane/ethylacetone (2:1 v/v)). After the solvent was recovered under reduced pressure, the residue was recrystallized from chloroform/hexane to obtain 12.3 g (yield: 40%) of awhite powdered crystal.

Synthesis of Arm

In a nitrogen-substituted 300 mL four-necked flask, 10.8 g of dehydrated THF and 101.9 g of dehydrated toluene were added and a reaction system was maintained at −40° C. under stirring. To the reaction system, an n-butyl lithium 2.2 g (5.1 mmol)/hexane solution was added. After 5 minutes, 20.4 g (195.9 mmol) of styrene was added to the reaction system and polymerization was performed. 20 minutes after the completion of dropwise addition, sampling was performed and the completion of the polymerization was confirmed by GC. The analysis of the polymer solution by GPC revealed that the polymer solution contains a unimodal polymer having a molecular weight Mn of 4,400 and a dispersion degree Mw/Mn of 1.05.

Star Reaction

In the reaction system, 3 ml of a α,α,α',α'-tetrakis-(4-(bis (4-ethoxycarbonylphenyl)methoxyphen yl))p-xylene 0.48 g (0.28 mmol)/THF solution dissolved in 5 ml of dehydrated THF was added. The reaction was continued for 30 minutes and then terminated using methanol. The polymer solution was poured into a large amount of methanol to precipitate a polymer, which was collected by filtration, washed and then dried under vacuum at 50° C. for 5 hours to obtain a white powdered polymer.

Using preparative GPC, an excess amount of an arm polymer was removed to obtain a white powdered star polymer. The analysis of the polymer by GPC revealed that the polymer is a unimodal polymer having a molecular weight Mn of 34,500 and a dispersion degree Mw/Mn of 1.02. Measurement by GPC-MALLS revealed that the polymer has a molecular weight Mw of 70,100.

Example 10

Synthesis of Star Polymer having Functional Group
Synthesis of OTBDMS Group (t-butyldimethylsilyloxy Group)

In a nitrogen-substituted 2,000 mL four-necked flask, 113 g of dehydrated tetrahydrofuran, 1,020 g of dehydrated toluene and 13.75 g (29.3 mmol) of 1,1-bis(3-(t-butyldimethyl-silyloxymethyl)phenyl)ethene (hereinafter abbreviated to DPE-(m-MOTBDMS)$_2$) were charged and a reaction system was maintained at −40° C. under stirring. To the reaction system, 11.35 g (26.7 mmol) of an n-butyl lithium/hexane 1.6 mol/L solution was added, followed by stirring for 30 minutes. Then, 200 g (1920.3 mmol) of styrene was added to the reaction system and polymerization was performed. 20 minutes after the completion of dropwise addition, sampling was performed and the completion of the polymerization was confirmed by GC. The analysis of the polymer solution by GPC revealed that the polymer solution contains a unimodal polymer having a molecular weight Mn of 9,400 and a dispersion degree Mw/Mn of 1.049.

Star Reaction

In the reaction system, 1.56 g (2.5 mmol) of 1,1,2,2-tetrakis-(4-ethoxycarbonylphenyl)ethane dissolved in 25 ml of dehydrated THF was added. The reaction was continued for 30 minutes and then terminated using methanol. The polymer solution was poured into a large amount of methanol to precipitate a polymer, which was collected by filtration, washed and then dried under vacuum at 50° C. for 5 hours to obtain 205 g (yield: 97%) of a white powdered polymer.

Using preparative GPC, an excess amount of an arm polymer was removed to obtain a white powdered star polymer. The analysis of the polymer by GPC revealed that the polymer is a unimodal polymer having a molecular weight Mn of 46,800 and a dispersion degree Mw/Mn of 1.021. Measurement by GPC-MALLS revealed that the polymer has a molecular weight Mw of 81,100 and a dispersion degree Mw/Mn of 1.013.

Example 11

Functional Group Conversion (Conversion of OTBDMS Group into OH Group)

In a nitrogen-substituted 2,000 mL flask, 1,500 ml of dehydrated THF, 200 g of the star polymer produced in Example 10 and 100 ml (1.0 M in THF) of tetra-n-butylammonium fluoride (TABF) were added, followed by stirring at room temperature overnight. The solvent was reduced to half by concentration and the solution was poured into a large amount of methanol to precipitate a polymer, which was collected by filtration, washed and then dried under vacuum at 50° C. for 5 hours to obtain 195 g (yield: 98%) of a white powdered polymer.

Example 12

Functional Group Conversion (Conversion of OH Group into OBiB Group(bromo isobutylbutylate group))

In a nitrogen-substituted-2,000 mL four-necked flask, 1,200 ml of dehydrated THF, 190 g (2.3 mmol) of the star polymer (OH group) produced in Example 11 and 5.70 g (56.3 mmol) of triethylamine were added and a reaction system was maintained at 0° C. under stirring. To the reaction system, 11.2 g (48.7 mmol) of bromoisobutyryl bromide was gradually added. After the completion of dropwise addition, the temperature was returned to room temperature, followed by stirring overnight. After TEA bromate was removed by filtration, the solvent was reduced to half by concentration and the solution was poured into a large amount of methanol to precipitate a polymer, which was collected by filtration and washed. The resulting polymer was fractionally purified with THF/methanol, reprecipitated with a large amount of methanol and then dried under vacuum at 50° C. for 5 hours to obtain 140 g (yield: 74%) of a white powdered polymer.

The analysis of the polymer by GPC revealed that the polymer is a unimodal polymer having a molecular weight Mn of 45,700 and a dispersion degree Mw/Mn of 1.026. Measurement by GPC-MALLS revealed that the polymer has a molecular weight Mw of 82,500 and a dispersion degree Mw/Mn of 1.020.

Example 13

Ring-Opening Living Polymerization

In a nitrogen-substituted 50 mL flask, 1.30 g (0.0348 mmol) of a star polymer (Mw=37,400) produced in the same manner as in Example 11, 5.49 g (53.78 mmol) of trimethylene carbonate (TMC) and 20 ml of toluene were charged, followed by heating at 50° C. In the reaction solution, 0.325 g (2.85 mmol) of trifluoroacetic acid (TFA) was added, followed by aging at 50° C. for 45 hours. After reprecipitating with a large amount of methanol, preparative GPC was performed to obtain a white viscous polymer (Mw=82500, Mw/Mn=1.032).

Example 14

Functional Group Conversion (Conversion of OTBDMS Group (t-butyldimethylsilyloxy Group) into Br Group)

In a nitrogen-substituted 200 mL flask, 3.509 (0.0781 mmol) of a star polymer (Mw=44,800) produced in the same manner as in Example 10, 0.34 g (3.91 mmol) of LiBr, 50 g of chloroform and 10 g of acetonitrile were charged, followed by heating at 40° C. After the system became uniform, 0.64 g (5.86 mmol) of trimethylsilane chloride was added, followed by aging at 40° C. for 48 hours. After washing with water and reprecipitating in a large amount of methanol, the resulting precipitate was dried at 50° C. under reduced pressure for 5 hours to obtain 3.25 g of a white polymer.

Example 15

In a 1,000 ml flask, 12.3 g (0.15 mol) of the star polymer produced in Example 12, 110.7 g (99.43 mol) of methoxypolyethylene glycol monomethacrylate (BLENMER PME-1000, manufactured by NOF CORPORATION) and 500 g of toluene were charged and then deaerated. 0.46 g (0.48 mmol) of dichlorotris(triphenylphosphine) ruthenium was added and, after uniformly dissolving, 0.25 g (1.9 mmol) of di-n-butylamine was added. Then, the polymerization reaction was initiated by heating to 80° C. 24 hours after the initiation of the polymerization reaction, the polymerization reaction was terminated by cooling the reaction solution to 0° C. A metal complex and an unreacted monomer were removed from the reaction solution by applying to a column. The solvent was concentrated under reduced pressure and the resulting viscous residue was dried under reduced pressure at 60° C. for 5 hours. Measurement by GPC-MALLS revealed that the polymer has a molecular weight Mw of 613,000 and a dispersion degree Mw/Mn of 1.264.

Example 16

Synthesis of Arm having OTBDMS Group (t-butyldimethylsilyloxy Group)

In a nitrogen-substituted 2,000 mL four-necked flask, 113 g of dehydrated tetrahydrofuran (hereinafter abbreviated to THF), 1,020 g of dehydrated toluene and 13.75 g (29.3 mmol) of DPE-(m-MOTBDMS)$_2$ were charged and a reaction system was maintained at −40° C. To the reaction system, 11.35 g (26.7 mmol) of an n-butyl lithium/hexane (1.6 mol/L) solution was added, followed by stirring for 30 minutes. Then, 200 g (1920.3 mmol) of styrene was added to the reaction system and polymerization was performed. 20 minutes after the completion of dropwise addition, sampling was performed and the completion of the polymerization was confirmed by gas chromatography (hereinafter abbreviated to GC). The analysis of the polymer solution by gel permeation chromatograph (hereinafter abbreviated to GPC) revealed that the polymer solution contains a unimodal polymer having a molecular weight Mn of 9,400 and a dispersion degree Mw/Mn of 1.049.

Star Reaction

In the reaction system, 1.56 g (2.5 mmol) of 1,1,2,2-tetrakis-(4-ethoxycarbonylphenyl)ethane dissolved in 25 ml of dehydrated THF was added. The reaction was continued for 30 minutes and then terminated using methanol. The polymer solution was poured into a large amount of methanol to precipitate a polymer, which was collected by filtration, washed and then dried under vacuum at 50° C. for 5 hours to obtain 205 g (yield: 97%) of a white powdered polymer.

Using preparative GPC, an excess amount of an arm polymer was removed to obtain a white powdered star polymer. The analysis of the polymer by GPC revealed that the polymer is a unimodal polymer having a molecular weight Mn of 46,800 and a dispersion degree Mw/Mn of 1.021. Measurement by a multiple-angle light scattering detector (hereinafter abbreviated to GPC-MALLS) revealed that the polymer has a molecular weight Mw of 81,100 and a dispersion degree Mw/Mn of 1.013.

Functional Group Conversion (Conversion of OTBDMS Group into OH Group)

In a nitrogen-substituted 2,000 mL flask, 1,500 ml of dehydrated THF, 200 g of an eight-arm star polymer produced above and 100 ml (1.0 M in THF) of tetra-n-butylammonium fluoride (TABF) were added, followed by stirring at room temperature overnight. The solvent was reduced to half by concentration and the solution was poured into a large amount of methanol to precipitate a polymer, which was collected by filtration, washed and then dried under vacuum at 50° C. for 5 hours to obtain 195 g (yield: 98%) of a white powdered polymer.

Functional Group Conversion (Conversion of OH Group into OBiB Group (bromo isobutylbutylate group))

In a nitrogen-substituted-2,000 mL four-necked flask, 1,200 ml of dehydrated THF, 190 g (2.3 mmol) of the eight-arm star polymer (OH group) converted into an OH group and 5.70 g (56.3 mmol) of triethylamine were added and a reaction system was maintained at 0° C. under stirring. To the reaction system, 11.2 g (48.7 mmol) of bromoisobutyryl bromide was gradually added. After the completion of dropwise addition, the temperature was returned to room temperature, followed by stirring overnight. After TEA bromate was removed by filtration, the solvent was reduced to half by concentration and the solution was poured into a large amount of methanol to precipitate a polymer, which was collected by filtration and washed. The resulting polymer was fractionally purified with THF/methanol, reprecipitated with a large amount of methanol and then dried under vacuum at 50° C. for 5 hours to obtain 140 g (yield: 74%) of a white powdered polymer.

The analysis of the polymer by GPC revealed that the polymer is a unimodal polymer having a molecular weight Mn of 45,700 and a dispersion degree Mw/Mn of 1.026. Measurement by GPC-MALLS revealed that the polymer has a molecular weight Mw of 82,500 and a dispersion degree Mw/Mn of 1.020.

Living Radical Polymerization

In a 100 ml flask, 2.05 g (0.025 mmol) of the eight-arm star polymer converted into a bromo isobutylbutylate group, 7.79 g (7.00 mmol) of methoxypolyethylene glycol monomethacrylate (BLENMER PME-1000, manufactured by NOF CORPORATION), 0.41 g (3.15 mmol) of hydroxyethyl methacrylate (hereinafter abbreviated to HEMA) and 40 g of toluene were charged and then deaerated. 0.04 g (0.04 mmol) of dichlorotris(triphenylphosphine)ruthenium was added and, after uniformly dissolving, 0.02 g (0.16 mmol) of di-n-butylamine was added. Then, the polymerization reaction was initiated by heating to 80° C. 4 hours after the initiation of the polymerization reaction, the polymerization reaction was terminated by cooling the reaction solution to 0° C. The conversion rate was determined by NMR. As a result, it was 46% in the case of PME-1000, while it was 90% in the case of HEMA. A metal complex and an unreacted monomer were removed from the reaction solution by applying to a column. The solvent was concentrated under reduced pressure and N-methylpyrrolidone (hereinafter abbreviated to NMP) was added to prepare a 10% NMP solution. Consequently, it was found that PME-1000:HEMA:St=60:6:34 (weight ratio) and the PEO (polyethylene oxide) content=54% by weight.

Example 17

Living Radical Polymerization

In a 200 ml flask, 4.10 g (0.05 mmol) of a eight-arm star polymer converted into a bromo isobutylbutylate group produced in the same manner as in Example 16, 14.76 g (13.26 mmol) of PME-1000, 1.64 g (12.60 mmol) of hydroxyethyl methacrylate, and 80 g of toluene were charged and then deaerated. 0.08 g (0.08 mmol) of dichlorotris(triphenylphosphine) ruthenium was added and, after uniformly dissolving, 0.04 g (0.32 mmol) of di-n-butylamine was added. Then, the polymerization reaction was initiated by heating to 80° C. 5 hours after the initiation of the polymerization reaction, the polymerization reaction was terminated by cooling the reaction solution to 0° C. The conversion rate was determined by NMR. As a result, it was 66% in the case of PME-1000, while it was 97% in the case of HEMA. A metal complex and an unreacted monomer were removed from the reaction solution by applying to a column. The solvent was concentrated under reduced pressure and NMP was added to prepare a 10% NMP solution. Consequently, it was found that PME-1000:HEMA:St=63:11:26 (weight % ratio) and the PEO content=57% by weight.

Example 18

Living Radical Polymerization

In a 200 ml flask, 4.0 g (0.1 mmol) of a eight-arm star polymer (Mw=39,500, Mw/Mn=1.01) converted into a bromo isobutylbutylate group produced in the same manner as in Example 16, 33.8 g (30.3 mmol) of PME-1000, 1.8 g (13.7 mmol) of hydroxyethyl methacrylate and 92 g of toluene were charged and then deaerated. 0.3 g (0.3 mmol) of dichlorotris(triphenylphosphine) ruthenium was added and, after uniformly dissolving, 0.2 g (1.3 mmol) of tributylamine was added. Then, the polymerization reaction was initiated by heating to 80° C.

5 hours after the initiation of the polymerization reaction, the polymerization reaction was terminated by cooling the reaction solution to 0° C. The conversion rate was determined by NMR. As a result, it was 60% in the case of PME-1000, while it was 92% in the case of HEMA. A metal complex and an unreacted monomer were removed from the reaction solution by applying to a column. The solvent was concentrated under reduced pressure to obtain a viscous substance. Measurement of the polymer solution by GPC-MALLS revealed that the polymer has a molecular weight Mw of 333,100 and a dispersion degree Mw/Mn of 1.24. Consequently, it was found that PME-1000:HEMA:St=80:7:13 (weight ratio) and the PEO (polyethylene oxide) content=73% by weight.

Example 19

Synthesis of Star Polymer Having Functional Group

In a nitrogen-substituted 5,000 mL four-necked flask, 284 g of dehydrated tetrahydrofuran (hereinafter abbreviated to THF), 2,550 g of dehydrated toluene and 33.75 g (72.0 mmol) of DPE-(m-MOTBDMS)$_2$ were added and a reaction system was maintained at −40° C. under stirring. To the reaction system, 28.4 g (66.7 mmol) of an n-butyl lithium/hexane 1.6 mol/L solution was added, followed by stirring for 30 minutes. Then, 508.5 g (4.882 mmol) of styrene was added to the reaction system and polymerization was performed. 40 minutes after the completion of dropwise addition, sampling was performed and the completion of the polymerization was confirmed by GC.

In the reaction system, 3.82 g (6.1 mmol) of 1,1,2,2-tetrakis-(4-ethoxycarbonylphenyl)ethane dissolved in 1,000 ml of dehydrated THF was added. The reaction was continued for 30 minutes and then terminated using methanol. The polymer solution was poured into a large amount of methanol to precipitate a polymer, which was collected by filtration, washed and then dried under vacuum at 50° C. for 5 hours to obtain 555 g of a white powdered polymer. A portion of the polymer was collected and an excess amount of an arm polymer was removed by a liquid separation operation to obtain a white powdered star polymer. The analysis of the polymer solution by GPC revealed that it contains a unimodal polymer having a molecular weight Mn of 47,000 and a dispersion degree Mw/Mn of 1.021. Measurement by GPC-MALLS revealed that the polymer has a molecular weight Mw of 80,900 and a dispersion degree Mw/Mn of 1.01.

Functional Group Conversion (Conversion of OTBDMS Group into OH Group

In a nitrogen-substituted 500 mL flask, 2,000 ml of dehydrated THF, 5509 of the star polymer produced herein and 1,000 ml (11.0M in THF) of tetra-n-butylammonium fluoride (TABF) were added, followed by stirring at room temperature overnight. The solvent was reduced to half by concentration and the solution was poured into a large amount of methanol to precipitate a polymer, which was collected by filtration, washed and then dried under vacuum at 50° C. for 5 hours to obtain 523 g of a white powdered polymer.

Functional Group Conversion (Conversion of OH Group into OBiB Group (bromoisobutyl butyrate group))

In a nitrogen-substituted-3,000 mL four-necked flask, 2,200 ml of dehydrated THF, 493 g of the star polymer (OH group) converted into an OH group and 29 ml of triethylamine (hereinafter abbreviated to TEA) were added and a reaction system was maintained at 0° C. under stirring. To the reaction system, 39.5 of bromoisobutyryl bromide was gradually added. After the completion of dropwise addition, the temperature was returned to room temperature, followed by stirring overnight. After TEA bromate was removed by filtration, the solvent was reduced to half by concentration and the solution was poured into a large amount of methanol to precipitate a polymer, which was collected by filtration and washed. The resulting polymer was fractionally purified with THF/methanol, reprecipitated with a large amount of methanol and then dried under vacuum at 50° C. for 5 hours to obtain 377 g of a white powdered polymer.

The analysis of the polymer solution by GPC revealed that the polymer is a unimodal polymer having a molecular weight Mn of 45,300 and a dispersion degree Mw/Mn of 1.023. Measurement by GPC-MALLS revealed that the polymer has a molecular weight Mw of 77,900 and a dispersion degree Mw/Mn of 1.00.

Living Radical Polymerization

Figure 2:
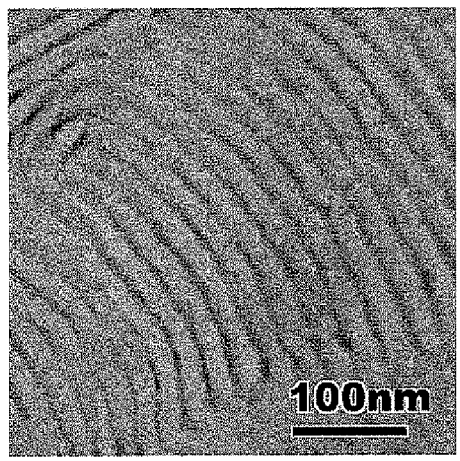
FIG. 2 is a transmission electron microscope (TEM) photograph showing a microphase separation structures of a star polymer (a) sampled 1 hour after the initiation of the polymerization reaction, a star polymer (b) sampled 2 hours after the initiation of the polymerization reaction, a star polymer (c) sampled 3 hours after the initiation of the polymerization reaction, a star polymer (d) sampled 6 hours after the initiation of the polymerization reaction in the living radical polymerization of Example 19.
Figure 2:
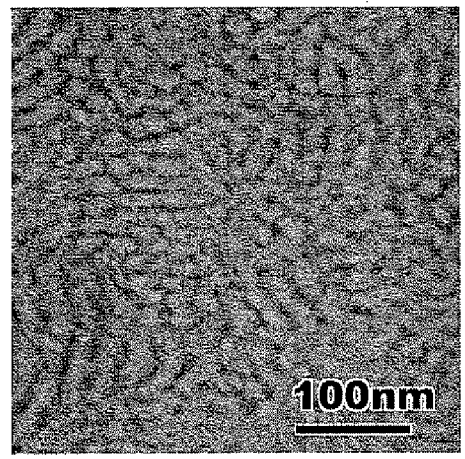
Figure 2:
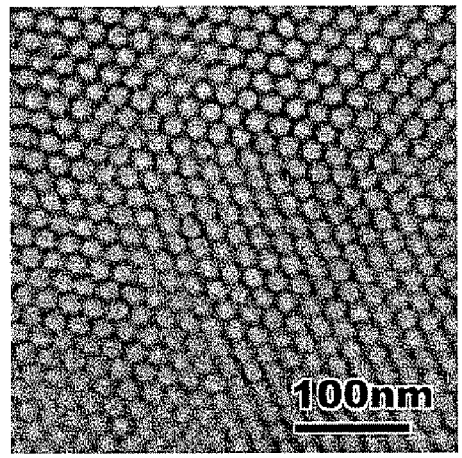
Figure 2:
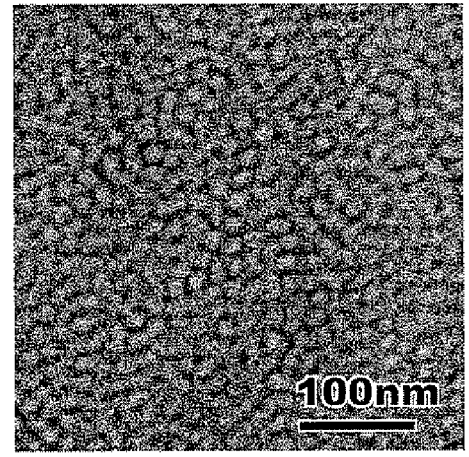
Figure 3:
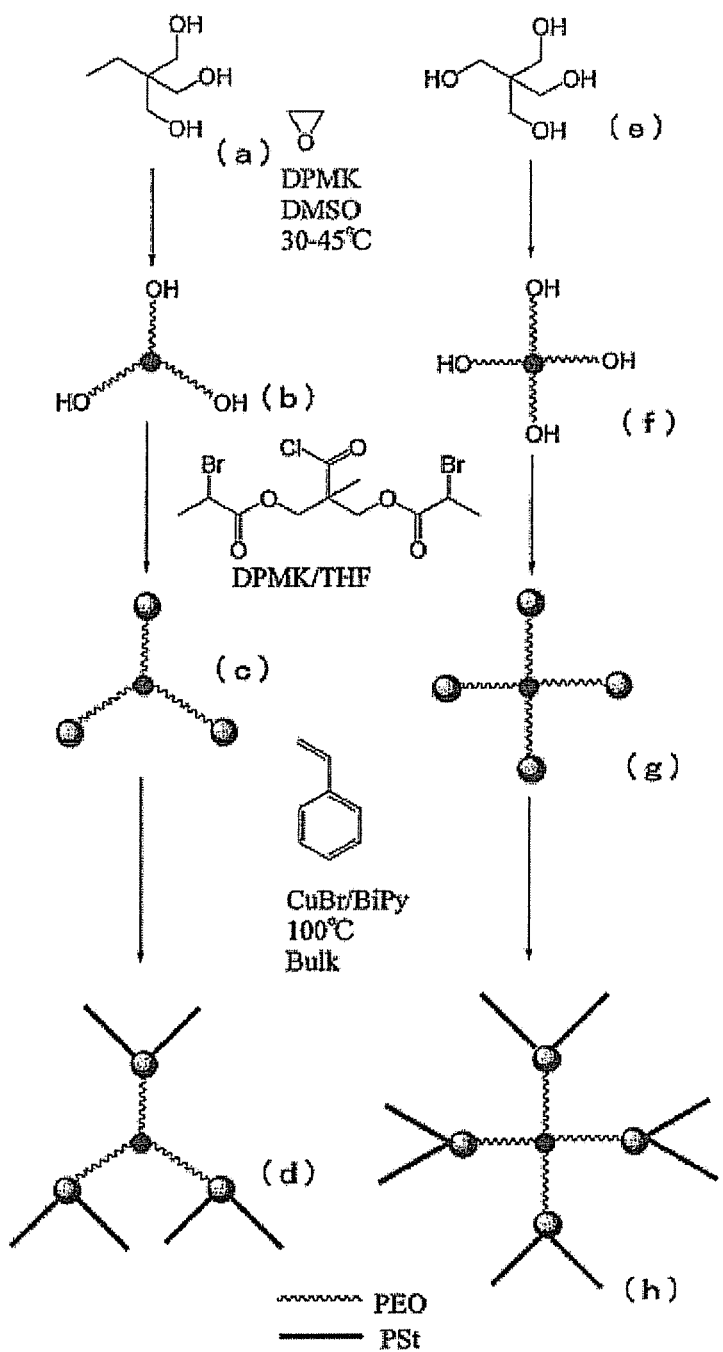
FIG. 3: Chemical Formula I. In a first step, a star polymer having a specific molecular weight, which includes three PEO arms, is synthesized by a core-first method using 2-ethyl-2-hydroxymethyl-1,3-propanediol. All three alcohol groups (a) efficiently initiate polymerization of ethylene oxide to produce a product having Poisson molecular weight distribution. In the same manner, a PEO star polymer including four arms can be prepared using pentaerythritol (e). In a second step, a terminal alcohol group is chemically modified with an acid halide to prepare star type macroinitiators (c) and (g). In a final step, an amphiphilic star copolymer is synthesized by the growth of a polystyrene block in the presence of copper bromide/BiPy with respect to the star type macroinitiators (c) and (g) (refer to Scheme 2 of Non-Patent Document 1).

In a 200 ml flask, 3.90 g (0.05 mol) of the star polymer produced converted into an OBiB group (bromo isobutylbutylate group), 22.1 g (19.8 mol) of methoxypolyethylene glycol monomethacrylate (BLENMER PME-1000, manufactured by NOF CORPORATION) and 78 g of toluene were charged and then deaerated. 0.15 g (0.16 mmol) of dichlorotris(triphenylphosphine) ruthenium was added and, after uniformly dissolving, 0.08 g (0.64 mmol) of di-n-butylamine was added. Then, the polymerization reaction was initiated by heating to 80° C. After the initiation of the polymerization reaction, sampling was performed at a predetermined time. After 6 hours, the polymerization reaction was terminated by cooling the reaction solution to 0° C. A metal complex and an unreacted monomer were removed from the reaction solution by applying to a column. The solvent was concentrated under reduced pressure and the resulting viscous residue was dried under reduced pressure at 60° C. for 5 hours. The composition and characteristics of the resulting polymers are shown as star polymers (a), (b), (c) and (d) in Table 1. FIG. 2 is a transmission electron microscope (TEM) photograph showing a microphase separation structure of these star polymers.

TABLE 1

| Star Polymer Sample | Time | TEM Photograph symbol | Weight average molecular weight (Mw) | Dispersion Degree Mw/Mn | PEGMA/St (w/w %) | PEO (wt %) |
|---|---|---|---|---|---|---|
| (a) | 1 Hr | a | 142,700 | 1.07 | 45/55 | 40.6 |
| (b) | 2 Hr | b | 192,800 | 1.07 | 65/35 | 58.8 |
| (c) | 3 Hr | c | 317,700 | 1.17 | 75/25 | 67.7 |
| (d) | 6 Hr | d | 420,100 | 1.17 | 81/19 | 73.5 |

PEGMA: PME-1000 (methoxypolyethylene glycol monomethacrylate).

Industrial Applicability

The star polymer of the present invention is a narrow distribution star polymer having a molecular weight distribution of 1.01 to 1.30, the molecular structure of which is controlled, and is useful as a raw material for production of a polymer solid electrolyte having excellent thermal characteristics, mechanical strength and ionic conductivity, and an adhesive material. For example, the star polymer is suited for use as electrochemical materials of batteries, capacitors, sensors, condensers, EC elements, or photoelectric transducers; inclusion materials; and functional materials of electric appliances or industrial equipment.

Also, the resulting phase separation structure is suited for use as lithographic materials, pattern formation materials, nanopattern formation materials, high density recording media such as patterned media, magnetic materials, magnetic recording materials, and resist materials since it can form a microphase separation structure and also can control the size of a domain.

According to the method for producing a star polymer in the present invention, it is possible to produce a narrow distribution star polymer having a controlled molecular weight simply and efficiently. The method of the present invention is suited for use as a method for producing a star polymer of the present invention.

The invention claimed is:

1. A star polymer comprising a core portion and an arm portion, wherein the arm portion includes a first generation composed of a polymer chain and a second generation composed of a polymer chain formed at the outer shell of the first generation, the number of arms of the second generation is larger than the number of arms of the first generation, the first generation composed of the polymer chain is a polymer chain derived from a monomer having a polymerizable double bond, and a ratio of a weight average molecular weight (Mw) to a number average molecular weight (Mn), (Mw/Mn), of the star polymer is within a range from 1.001 to 2.50, the second generation is a polymer chain which includes a repeating unit containing a structure represented by formula (II):

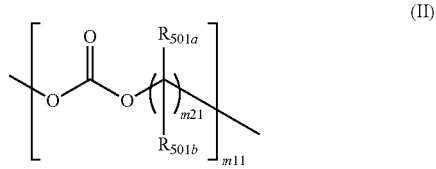

wherein $R_{501a}$ and $R_{501b}$ each independently represents a hydrogen atom or a C1-C10 hydrocarbon group, m21 represents an integer of 2 or more, each $R_{501a}$ may be the same as or different from one another and $R_{501b}$, may be the same as or different from one another, and m11 represents an integer of 1 or more, or a repeating unit represented by formula (III):

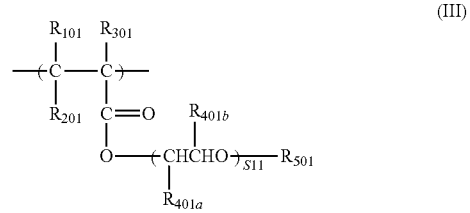

wherein $R_{101}$ to $R_{301}$ each independently represents a hydrogen atom or a C1-C10 hydrocarbon group, and $R_{101}$ and $R_{301}$ may be bonded to form a ring, $R_{401a}$ and $R_{401b}$ each independently represents a hydrogen atom or a methyl group, $R_{501}$ represents a hydrogen atom, a hydrocarbon group, an acyl group or a silyl group, and s11 represents any integer from 1 to 100 and when s11 is 2 or more, groups represented by the formula —CH($R_{401a}$)CH($R_{401b}$)O— may be the same or different.

2. The star polymer according to claim 1, wherein the ratio of the weight average molecular weight (Mw) to the number average molecular weight (Mn), (Mw/Mn), of the star polymer is within a range from 1.001 to 1.50.

3. The star polymer according to claim 1, wherein the number of arms of the second generation is 1.5 to 3.0 times larger than the number of arms of the first generation.

4. The star polymer according to claim 1, wherein the first generation composed of the polymer chain in the arm portion is a styrenic polymer.

5. The star polymer according to claim 1, wherein the polymer chain constituting the second generation is a polymer chain obtained by performing a polymerization reaction using the polymer chain end constituting the first generation as the starting point.

6. A star polymer comprising a core portion and an arm portion containing a structure represented by the formula (VII):

wherein B represents a group composed of a polymer chain, A represents a group composed of a polymer chain, and R represents a hydrogen atom or a C1-C4 alkyl group, a ratio of a weight average molecular weight (Mw) to a number average molecular weight (Mn), (Mw/Mn), of the star polymer is within a range from 1.001 to 2.50 and the core portion contains one or more aromatic rings, and the arm portion represented directly by formula (VII) is branched from the aromatic ring, A or B represents a group a1 or b1 composed of a polymer chain having two or more functional groups at the end, and A or B contains a group a2 or b2 composed of a polymer chain which further extends from the end of a group a1 or b1 composed of a polymer chain having two or more functional groups at the end.

7. The star polymer according to claim 6, wherein the ratio of the weight average molecular weight (Mw) to the number average molecular weight (Mn), (Mw/Mn), of the star polymer is within a range from 1.001 to 1.50.

8. The star polymer according to claim 6, wherein the functional group is a silyloxy group, an aryloxy group, an alkoxy group, a trimethylsilyloxymethyl group, a 2-trimethylsilyloxyethyl group, a methoxymethyl group, a t-butoxymethyl group or a 1-ethoxyethoxymethyl group.

9. The star polymer according to claim 6, wherein the polymer chain having two or more functional groups at the end is a polymer chain which includes an end containing a structure having a carbon skeleton represented by formula (IV-1), or formula (IV-2):

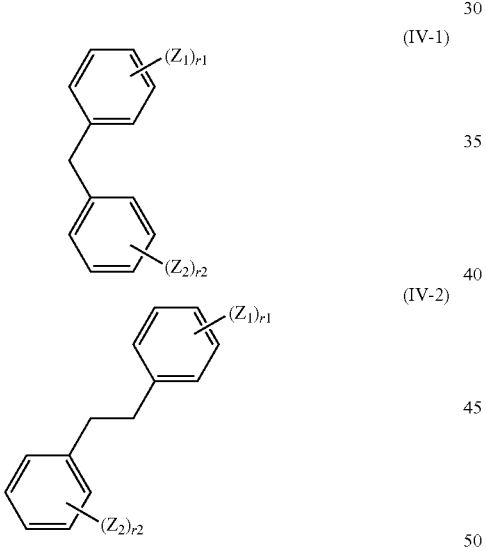

wherein $Z_1$ and $Z_2$ each independently represents a hydroxyl group, a functional group containing an active halogen, a hydroxyalkyl group, a halogenated alkyl group, OR' (R' represents a hydrogen atom or an organic group), a silyloxy group, an aryloxy group, an alkoxy group, a trimethylsilyloxymethyl group, a 2-trimethylsilyloxyethyl group, a methoxymethyl group, a t-butoxymethyl group, a 1-ethoxyethoxymethyl group, or a functional group containing a polymer chain, and r1 and r2 each independently represents any integer from 1 to 5 and when r1 or r2 is 2 or more, each $Z_1$ may be the same as or different from one another and $Z_2$ may be the same as or different from one another.

10. The star polymer according to claim 9, wherein the functional group containing an active halogen is a functional group containing a halogen atom at the α-position of the aromatic ring, or a functional group having a structure represented by formula (VI-1) or formula (VI-2):

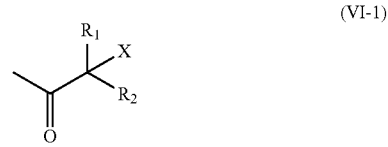

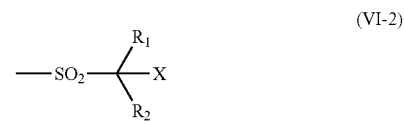

wherein X represents a halogen atom, and $R_1$ and $R_2$ each independently represents a hydrogen atom, a halogen atom or an organic group, provided that both $R_1$ and $R_2$ are not halogen atoms at the same time.

11. The star polymer according to claim 6, wherein the core portion contains a skeleton represented by formula (VIII):

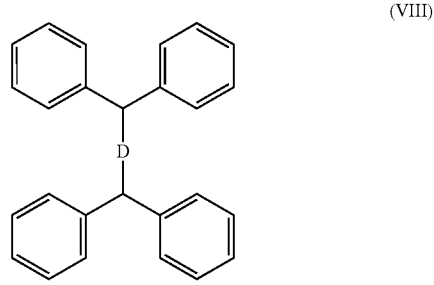

wherein D represents $(CH_2)_q$ or a p-phenylene group, and q represents an integer from 0 to 3.

12. The star polymer according to claim 6, wherein A represents a group composed of a polymer chain, and A or B represents a polymer chain containing a repeating unit represented by formula (III):

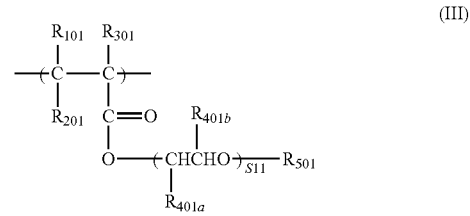

wherein $R_{101}$ to $R_{301}$ each independently represents a hydrogen atom or a C1-C10 hydrocarbon group, and $R_{101}$ and $R_{301}$ may be combined to form a ring, $R_{401a}$ and $R_{401b}$ each independently represents a hydrogen atom or a methyl group, $R_{501}$ represents a hydrogen atom, a hydrocarbon group, an acyl group, or a silyl group, s11 represents any integer from 1 to 100 and when s11 is 2 or more, groups represented by formula —CH($R_{401a}$)CH($R_{401b}$)O— may be the same or different, or a repeating unit represented by formula (II):

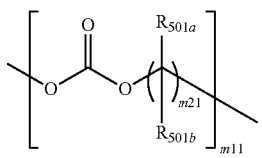
(II)

wherein $R_{501a}$ and $R_{501b}$ each independently represents a hydrogen atom or a C1-C10 hydrocarbon group, m21 represents an integer of 2 or more, each $R_{501a}$ may be the same as or different from one another and $R_{501b}$ may be the same as or different from one another, and m11 represents an integer of 1 or more.

13. The star polymer according to claim 6, wherein A represents a group composed of a polymer chain, and A or B represents a polymer chain containing a repeating unit represented by formula (IX):

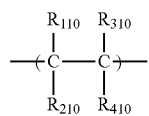
(IX)

wherein $R_{110}$ and $R_{310}$ each independently represents a hydrogen atom or a C1-C10 hydrocarbon group, and $R_{110}$ and $R_{310}$ may be combined to form a ring, $R_{210}$ represents an organic group containing at least one kind of a functional group selected from the group consisting of a hydrogen atom, a C1-C10 hydrocarbon group, a hydroxyl group, a hydrocarbonoxy group, a carboxyl group, an acid anhydride group, an amino group, an ester group and an epoxy group, and $R_{410}$ represents an organic group containing at least one kind of a functional group selected from the group consisting of a hydroxyl group, a carboxyl group, an epoxy group, an acid anhydride group and an amino group, and/or a repeating unit represented by formula (X):

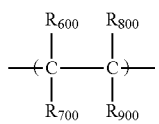
(X)

wherein $R_{600}$ to $R_{800}$ each independently represents a hydrogen atom or a C1-C10 hydrocarbon group, and $R_{900}$ represents an aryl group or a heteroaryl group.

14. The star polymer according to claim 6, wherein A represents a group composed of a polymer chain, A or B represents a polymer chain containing repeating units represented by formula (III):

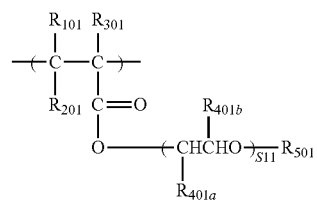
(III)

(wherein $R_{101}$ to $R_{301}$ each independently represents a hydrogen atom or a C1-C10 hydrocarbon group, and $R_{101}$ and $R_{301}$ may be combined to form a ring, $R_{401a}$ and $R_{401b}$ each independently represents a hydrogen atom or a methyl group, $R_{501}$ represents a hydrogen atom, a hydrocarbon group, an acyl group, or a silyl group, s11 represents any integer from 1 to 100 and when s11 is 2 or more, groups represented by formula —CH($R_{401a}$)CH($R_{401b}$)O— may be the same or different), and formula (X):

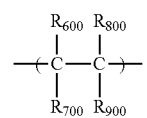
(X)

(wherein $R_{600}$ to $R_{800}$ each independently represents a hydrogen atom or a C1-C10 hydrocarbon group, and $R_{900}$ represents an aryl group or a heteroaryl group) at random.

* * * * *